(12) United States Patent
Lee et al.

(10) Patent No.: US 8,339,931 B2
(45) Date of Patent: Dec. 25, 2012

(54) METHOD AND APPARATUS FOR TRANSMITTING CONTROL INFORMATION IN WIRELESS COMMUNICATION SYSTEM

(75) Inventors: Young Seob Lee, Anyang-si (KR); Bin Chul Ihm, Anyang-Si (KR); Seunghee Han, Anyang-si (KR); Jin-young Chun, Anyang-si (KR); Suk Woo Lee, Anyang-si (KR); Min Seok Oh, Anyang-si (KR)

(73) Assignee: LG Electronics Inc., Seoul (KR)

( * ) Notice: Subject to any disclaimer, the term of this patent is extended or adjusted under 35 U.S.C. 154(b) by 467 days.

(21) Appl. No.: 12/631,347

(22) Filed: Dec. 4, 2009

(65) Prior Publication Data
US 2010/0142363 A1 Jun. 10, 2010

Related U.S. Application Data

(60) Provisional application No. 61/120,067, filed on Dec. 5, 2008, provisional application No. 61/121,195, filed on Dec. 10, 2008, provisional application No. 61/151,524, filed on Feb. 11, 2009.

(30) Foreign Application Priority Data
Jun. 24, 2009 (KR) ........................ 10-2009-0056298

(51) Int. Cl.
*H04J 11/00* (2006.01)

(52) U.S. Cl. ........................ 370/203; 370/330; 370/522
(58) Field of Classification Search ................. 370/203, 370/330, 522
See application file for complete search history.

(56) References Cited

U.S. PATENT DOCUMENTS

| | | | |
|---|---|---|---|
| 8,107,374 B2 * | 1/2012 | Su et al. | 370/231 |
| 2007/0086534 A1 | 4/2007 | Subramanyam et al. | |
| 2008/0025337 A1 | 1/2008 | Smith et al. | |
| 2008/0212701 A1 | 9/2008 | Pan et al. | |
| 2009/0296850 A1 * | 12/2009 | Xu et al. | 375/295 |
| 2010/0118800 A1 * | 5/2010 | Kim et al. | 370/329 |
| 2010/0208669 A1 * | 8/2010 | Chun et al. | 370/329 |

* cited by examiner

*Primary Examiner* — Jason Mattis
(74) *Attorney, Agent, or Firm* — Birch, Stewart, Kolasch & Birch, LLP

(57) ABSTRACT

A method and apparatus of transmitting control information in a wireless communication system is provided. A sequence corresponding to control information from a sequence set is determined. A reference modulation symbol set corresponding to a mini unit by modulating the sequence is generated. At least one reordered modulation symbol set is generated by reordering and repeating the reference modulation symbol set. The at least one reordered modulation symbol set is reordered in a unit of a subgroup. The reference modulation symbol set and the at least one reordered modulation symbol set are mapped to the plurality of mini units in the resource unit respectively.

15 Claims, 28 Drawing Sheets

METHOD AND APPARATUS FOR TRANSMITTING CONTROL INFORMATION IN WIRELESS COMMUNICATION SYSTEM

CROSS-REFERENCE TO RELATED APPLICATIONS

This application claims the benefit of priority of U.S. Provisional application No. 61/120,067 filed on Dec. 5, 2008, U.S. Provisional application No. 61/121,195 filed on Dec. 10, 2008, U.S. Provisional application No. 61/151,524 filed on Feb. 11, 2009, and Korean Patent Application No. 10-2009-0056298 filed on Jun. 24, 2009, all of which are incorporated by reference in their entirety herein.

BACKGROUND OF THE INVENTION

1. Field of the Invention

The present invention relates to wireless communications, and more particularly, to a method and apparatus for transmitting control information in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., 4-th generation) mobile communication standard following the IMT-2000. In late 2006, it was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

Control information includes a variety of information to control communication between a base station (BS) and a mobile station (MS). The control information includes a channel quality indicator (CQI) indicating a channel condition, an positive-acknowledgement (ACK)/negative-acknowledgement (NACK) for hybrid automatic repeat request (HARQ), and/or multiple input multiple output (MIMO) related information. The MIMO related information includes a precoding matrix indicator (PMI), a rank indicator (RI), etc., for an MIMO operation. Since the control information is in regard to decoding and/or scheduling of information bits, transmission reliability is important. This is because erroneous control information results in data communication errors. Therefore, in most wireless communication systems, a control channel for control information is designed independently from a data channel.

Uplink control information is transmitted by the MS to the BS. An uplink control channel carrying the uplink control information needs to be designed by considering power consumption and mobility of the MS.

The control information can be transmitted by using two methods. In a first method, the control information is transmitted in a codeword format by performing channel encoding on the control information. The first method requires a reference signal used in channel estimation for codeword decoding. In a second method, the control information is transmitted by mapping the control information to a sequence. The second method does not require the reference signal since the control information is detected using a correlation property. Detection using the reference signal is referred to as coherent detection. Detection not using the reference signal is referred to as non-coherent detection.

A sequence may be repetitively transmitted as one scheme used for robust and effective sequence transmission. The use of a repetitive sequence decreases a code-rate, thereby decreasing a transmission rate. However, by combining the repetitive sequence, detection performance of the control information can be improved.

When the sequence is transmitted by repeating the sequence in the same format, simple implementation is possible. However, when a resource used in sequence transmission is allocated mostly in any one of a time domain or a frequency domain, it may have an adverse effect on detection performance according to mobility of the MS. In addition, when using non-coherent detection, high mobility of the MS has an adverse effect on sequence detection performance, which may result in deterioration of transmission reliability of control information.

SUMMARY OF THE INVENTION

The present invention provides a method and apparatus for transmitting control information by repeating a sequence.

The present invention also provides a method and apparatus for transmitting uplink control information robust to high mobility of a mobile station.

In an aspect, a method of transmitting control information in a wireless communication system is provided. The method includes determining a sequence corresponding to control information from a sequence set, generating a reference modulation symbol set s corresponding to a mini unit by modulating the sequence, the mini unit comprising a plurality of contiguous subcarriers by a plurality of orthogonal frequency division multiplexing (OFDM) symbols, the plurality of subcarriers in the mini unit being indexed from 0 to 11 in a frequency-first order, mapping the reference modulation symbol set s to each of three mini units in the resource as follows:

$$C_{i,j}=s[K_i[j]], \text{ for } i=0,1,2, 0 \leq j \leq 11$$

where $C_{i,j}$ denotes a j-th logical subcarrier in an i-th mini unit, s[k] denotes a k-th modulation symbol in the modulation symbol set s, $K_i[j]$ denotes an j-th element of $K_i$, $K_0=\{0,1,2,3,4,5,6,7,8,9,10,11\}$, $K_1=\{9,10,11,3,4,5,0,1,2,6,7,8\}$, and $K_2=\{3,4,5,6,7,8,9,10,11,0,1,2\}$, and transmitting the mapped modulation symbol sets in the resource unit.

The three mini units in the resource may not be contiguous with one other in frequency domain.

The resource unit may be used for transmission of a fast feedback channel. The fast feedback channel may be a primary fast feedback channel.

The mapped modulation symbol sets in the resource unit may be detected by using non-coherent detection.

The sequence may be binary phase shift keying (BPSK) modulated.

The number of bits to represent the control conformation may be four or six.

In another aspect, a mobile station includes a radio frequency (RF) unit for transmitting a radio signal, and a processor operatively coupled with the RF unit and configured to determine a sequence corresponding to control information from a sequence set, generate a reference modulation symbol set s corresponding to a mini unit by modulating the sequence, the mini unit comprising a plurality of contiguous subcarriers by a plurality of orthogonal frequency division multiplexing (OFDM) symbols, the plurality of subcarriers in the mini unit being indexed from 0 to 11 in a frequency-first order, and map the reference modulation symbol set s to each of three mini units in the resource as follows:

$$C_{i,j}=s[K_i[j]], \text{ for } i=0,1,2, 0 \leq j \leq 11$$

where $C_{i,j}$ denotes a j-th logical subcarrier in an i-th mini unit, s[k] denotes a k-th modulation symbol in the modulation symbol set s, $K_i[j]$ denotes an j-th element of $K_i$, $K_0=\{0,1,2,3,4,5,6,7,8,9,10,11\}$, $K_1=\{9,10,11,3,4,5,0,1,2,6,7,8\}$, and $K_2=\{3,4,5,6,7,8,9,10,11,0,1,2\}$.

In still another aspect, a method of transmitting control information in a wireless communication system is provided. The method includes determining a sequence corresponding to control information from a sequence set, generating a reference modulation symbol set s corresponding to a mini unit by modulating the sequence, the mini unit comprising a plurality of contiguous subcarriers by a plurality of orthogonal frequency division multiplexing (OFDM) symbols, generating at least one reordered modulation symbol set by reordering and repeating the reference modulation symbol set s so that the total number of modulation symbol sets is same as the number of a plurality of mini units in a resource unit, wherein the reference modulation symbol set s is divided into a plurality of subgroup, and the at least one reordered modulation symbol set is reordered in an unit of a subgroup, mapping the reference modulation symbol set s and the at least one reordered modulation symbol set to the plurality of mini units in the resource unit respectively, and transmitting the mapped modulation symbol sets in the resource unit.

The mini unit may comprise two contiguous subcarriers by six OFDM symbols so that the total number of subcarriers in the mini unit is twelve, and the resource unit may comprise a first mini unit, second mini unit and third mini unit. The reference modulation symbol set s may include twelve modulation symbols s[j] ($0 \leq j \leq 11$) which correspond to logical subcarriers in the first mini unit, and a j-th modulation symbol s'[j] in a first reordered modulation symbol set s' corresponding to logical subcarriers in the second mini unit may be expressed by: s'[j]=s[$K_1$[j]], where $K_1$[j] is a j-th element of $K_1=\{9,10,11,3,4,5,0,1,2,6,7,8\}$.

A j-th modulation symbol s"[j] in a second reordered modulation symbol set s" corresponding to logical subcarriers in the third mini unit may be expressed by: s"[j]=s[$K_2$[j]], where $K_2$[j] is a j-th element of $K_2=\{3,4,5,6,7,8,9,10,11,0,1,2\}$.

In still another aspect, a transmitter includes a sequence generator configured to determine a sequence corresponding to control information from a sequence set, a modulator configured to generate a reference modulation symbol set s corresponding to a mini unit by modulating the sequence, the mini unit comprising a plurality of contiguous subcarriers by a plurality of orthogonal frequency division multiplexing (OFDM) symbols, a repeater configured to generate at least one reordered modulation symbol set by reordering and repeating the reference modulation symbol set s so that the total number of modulation symbol sets is same as the number of a plurality of mini units in a resource unit, wherein the reference modulation symbol set s is divided into a plurality of subgroup, and the at least one reordered modulation symbol set is reordered in an unit of a subgroup, and a resource mapper configured to map the reference modulation symbol set s and the at least one reordered modulation symbol set to the plurality of mini units in the resource unit respectively.

Transmission reliability of uplink control information can be ensured even when a mobile station has high mobility. Further, an additional operation is not required in sequence reordering, and thus performance can be improved without increase of complexity.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3-rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the IEEE 802.16m. However, technical features of the present invention are not limited thereto.

Figure 1:
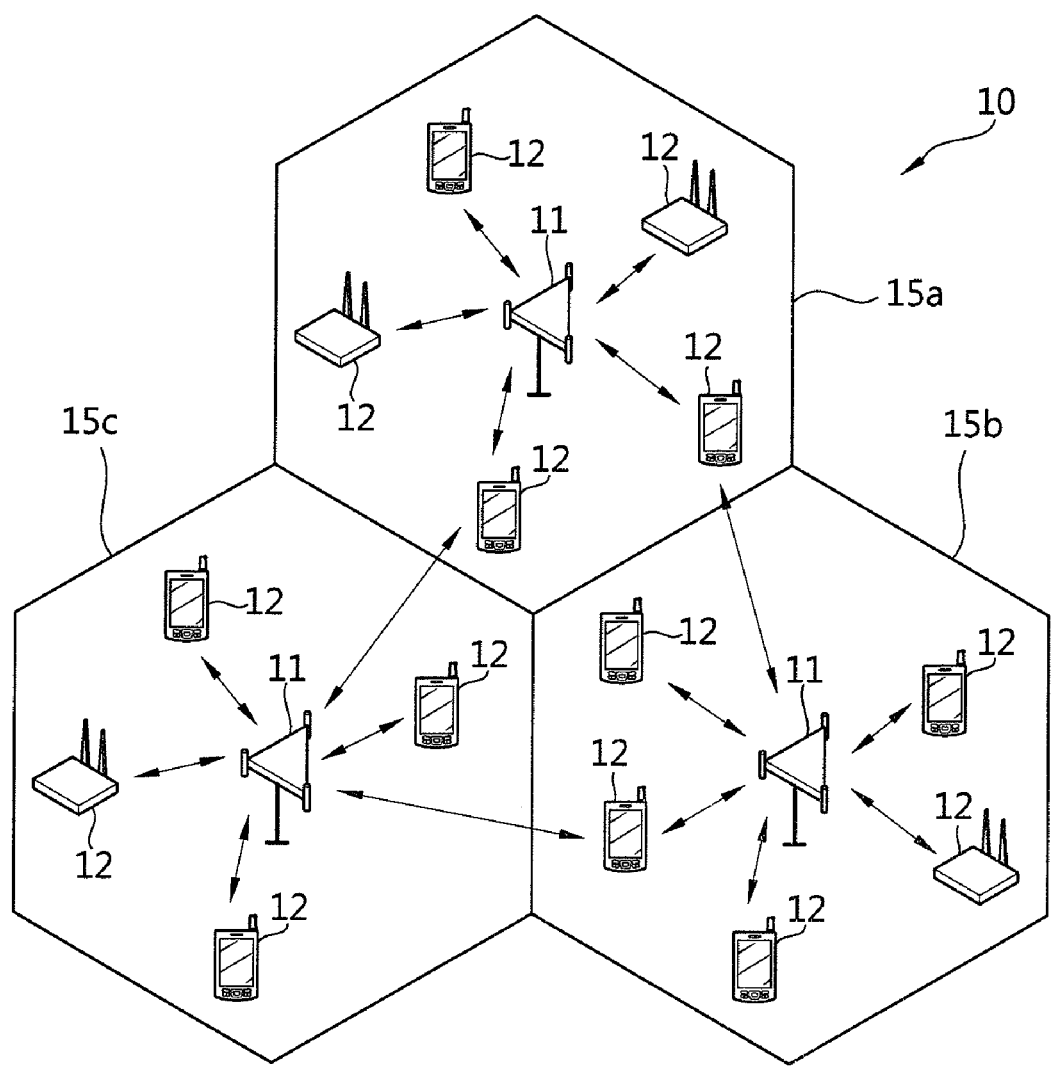
FIG. 1 shows a wireless communication system.

FIG. 1 shows a wireless communication system. A wireless communication system 10 includes at least one base station (BS) 11. BSs 11 provide communication services to specific geographical regions (generally referred to as a cells) 15a, 15b, and 15c. A cell can be divided into a plurality of regions (referred to as a sector). A mobile station (MS) 12 may be fixed or mobile, and may be referred to as another terminology, such as a user equipment (UE), a user terminal (UT), a subscriber station (SS), a wireless device, a personal digital assistant (PDA), a wireless modem, a handheld device, a mobile terminal, etc. The BS 11 is generally a fixed station that communicates with the MS 12 and may be referred to as another terminology, such as an evolved node-B (eNB), a base transceiver system (BTS), an access point, etc.

Hereinafter, downlink implies communication from the BS to the MS, and uplink implies communication from the MS to the BS. In the downlink, a transmitter may be a part of the BS, and a receiver may be a part of the MS. In the uplink, the transmitter may be a part of the MS, and the receiver may be a part of the BS.

Examples of an uplink control channel in an IEEE 802.16m system includes a fast feedback channel, a hybrid automatic repeat request (HARQ) feedback control channel, a sounding channel, a ranging channel, a bandwidth request channel, etc. The fast feedback channel carries feedback of a channel quality indicator (CQI) and/or multiple input multiple output (MIMO) information. The fast feedback channel is classified into two types, i.e., a primary fast feedback channel and a secondary fast feedback channel The primary fast feedback channel carries information of 4 to 6 bits, and provides a wideband CQI and/or MIMO feedback. The secondary fast feedback channel carries information of 7 to 24 bits, and provides narrowband CQI and/or MIMO feedback. The primary fast feedback channel supports non-coherent detection which does not use a reference signal. The secondary fast feedback channel supports coherent detection which uses the reference signal.

Figure 2:
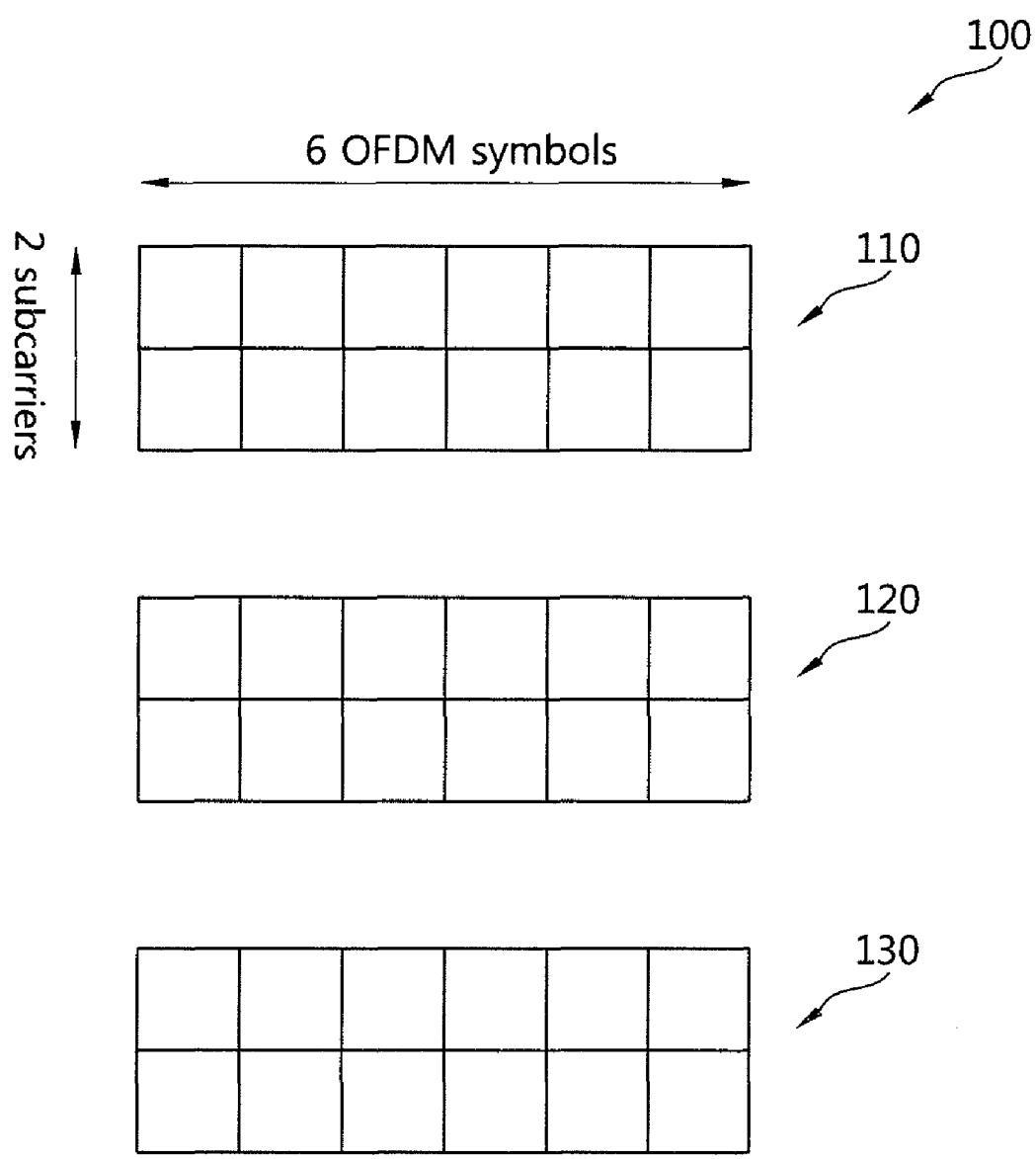
FIG. 2 shows an example of a resource unit used in an uplink control channel in an institute of electrical and electronics engineers (IEEE) 802.16m system.

FIG. 2 shows an example of a resource unit used in an uplink control channel in an IEEE 802.16m system. A resource unit 100 is a resource allocation unit used in transmission of the uplink control channel, and may also be referred to as a tile. The resource unit 100 may be a physical resource allocation unit or a logical resource allocation unit. The resource unit 100 includes mini units 110, 120, and 130. The mini unit may also be referred to as a mini tile. Each of the mini units 110, 120, and 130 includes two contiguous subcarriers over six orthogonal frequency division multiplexing (OFDM) symbols. The mini units 110, 120, and 130 included in the resource unit 100 may not be contiguous with one another in a frequency domain. This implies that at least one mini unit of another resource unit may be disposed between the first mini unit 110 and the second mini unit 120 and/or between the second mini unit 120 and the third mini unit 130. The mini units 110, 120 and 130 included in the resource unit 100 may be arranged in a distributed manner in the frequency domain to obtain frequency diversity.

The number of OFDM symbols included in the mini unit in time domain and/or the number of subcarriers included in the mini unit in frequency domain are for exemplary purposes only, and thus the present invention is not limited thereto. The mini unit may include a plurality of subcarriers over a plurality of OFDM symbols. The number of OFDM symbols included in the mini unit may vary depending on the number of OFDM symbols included in a subframe. For example, if the number of OFDM symbols included in one subframe is 6, the number of OFDM symbols included in the mini unit may be 6.

An OFDM symbol denotes a duration in the time domain, and is not limited to an OFDM/OFDMA-based system. The OFDM symbol may also be referred to as another terminology such as a symbol duration, and the technical features of the present invention are not limited by the terminology of the OFDM symbol to a specific multiple access scheme. In addition, a subcarrier denotes an allocation unit in the frequency domain. Although one subcarrier is used as the allocation unit, a subcarrier set unit may also be used as the allocation unit.

Figure 3:
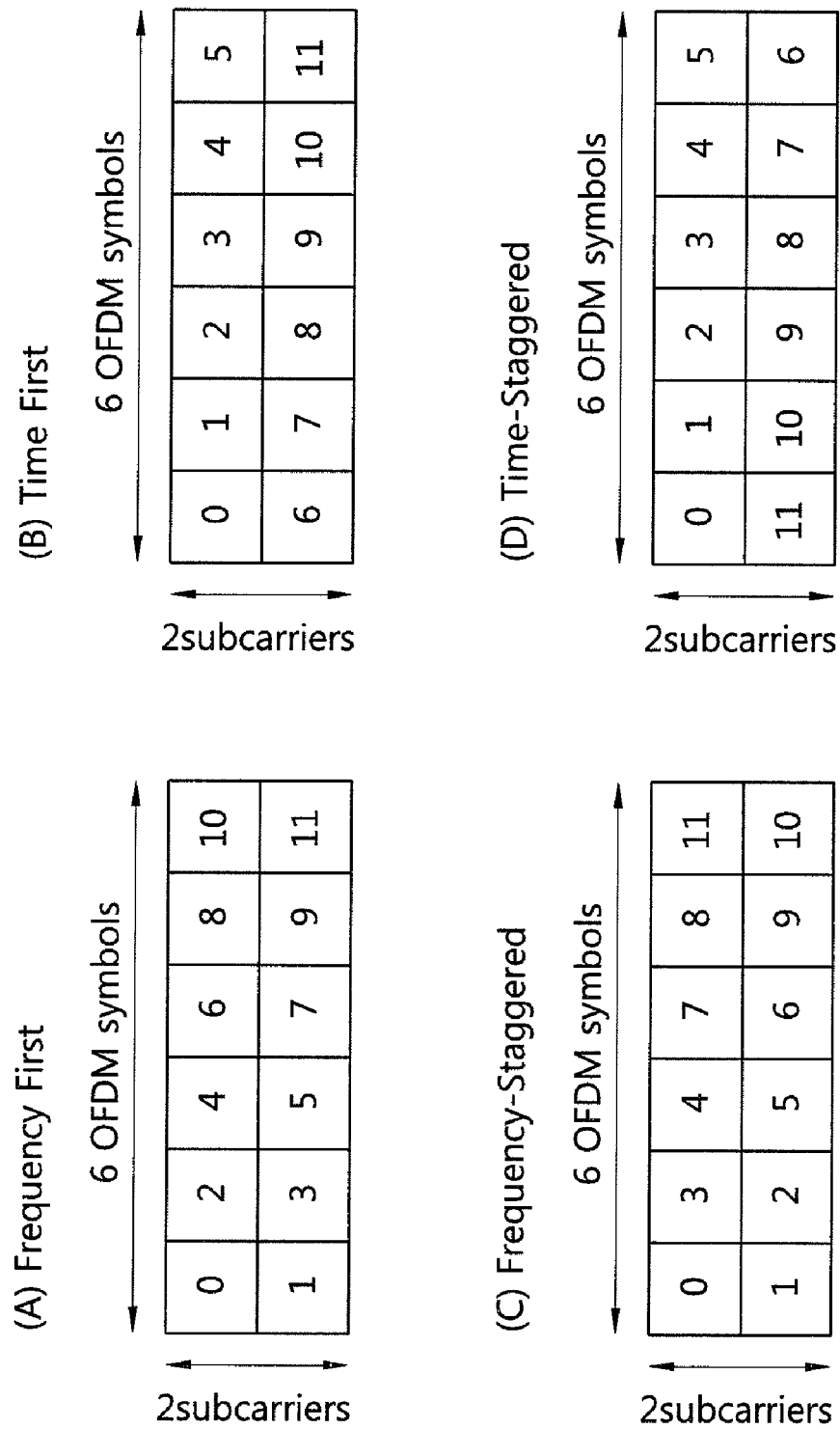
FIG. 3 shows various examples of indexing of subcarriers included in a mini unit.

FIG. 3 shows various examples of indexing of subcarriers included in a mini unit. The mini unit includes two contiguous subcarriers over six OFDM symbols, and thus includes 12 subcarriers in total. The subcarriers in a mini unit are respectively indexed from 0 to 11. The indexes of the subcarriers may be physical indexes or logical indexes. In order for modulation symbols to be mapped to the mini unit in an index order, an order of the indices of the 12 subcarriers is defined. In (A) of FIG. 3, in the same OFDM symbol, indexing is performed first in a frequency direction. This is referred to as 'frequency first' order indexing. In (B) of FIG. 3, indexing is performed first in an OFDM symbol order, and is then performed in a frequency direction. This is referred to as 'time first' order indexing. In (C) of FIG. 3, contiguous subcarriers are indexed in an order of frequency->time->frequency->time, which is referred to as 'frequency-staggered' order indexing. In (D) of FIG. 3, contiguous subcarriers are indexed in an order of time->frequency, which is referred to as 'time-staggered' order indexing.

Hereinafter, unless otherwise specified, it is assumed that the 12 subcarriers included in the mini unit are logically indexed from 0 to 11 in a frequency-first order. A subcarrier corresponding to each index is expressed by f[j] ($0 \leq j \leq 11$), where j is a logical subcarrier index.

In a proposed method, one sequence corresponding to one mini unit is repeated and is then mapped to each of 3 mini units constituting a resource unit. In this case, a time diversity gain and a frequency diversity gain are obtained by arranging a sequence differently for each mini unit. When the sequence is mapped for each mini unit, the following rule is considered.

(1) Elements of the sequence may be divided into a plurality of subgroups, and the sequence may be reordered in a unit of a subgroup. In this case, the number of elements included in one subgroup may be selected from divisors of a length of the sequence. For example, if the sequence has a length of 12, a size of a subgroup may be selected from one of divisors of 12, that is, from 1, 2, 3, 4, 6, and 12.

(2) Reordering is possible even in a subgroup.

(3) Reordering may be achieved in a subgroup unit by considering time diversity and/or frequency diversity according to a structure of the mini unit.

(4) When the structure of the mini unit is configured in a format capable of obtaining time diversity as much as possible in comparison with frequency diversity (i.e., when the number of OFDM symbols is greater than the number of subcarriers), the subgroup size may be determined by considering a maximum MS speed to be supported and a characteristic of a channel model. When considering a channel model in which influence of a channel exists for a long time, the subgroup size can be increased.

(5) The subgroup size may be determined by considering a sequence property. For example, when the sequence is generated based on a specific codeword set such as a Reed-Solomon (RS) code and when its codeword structure can be divided into groups having correlations, the subgroup size may be determined such that elements are contiguous by a size of each group. For example, in case of an RS code generated on Galois field $GF(2^3)$, one RS symbol can be expressed with 3 bits. In this case, the subgroup size may be 3.

(6) Sequences to be repeated within one period are arranged consecutively or contiguous as much as possible with respect to a time domain and/or a frequency domain.

(7) When the repeated sequences are arranged in the time domain and/or the frequency domain, a reordering pattern is determined by considering a distance between the sequences.

Figure 4:
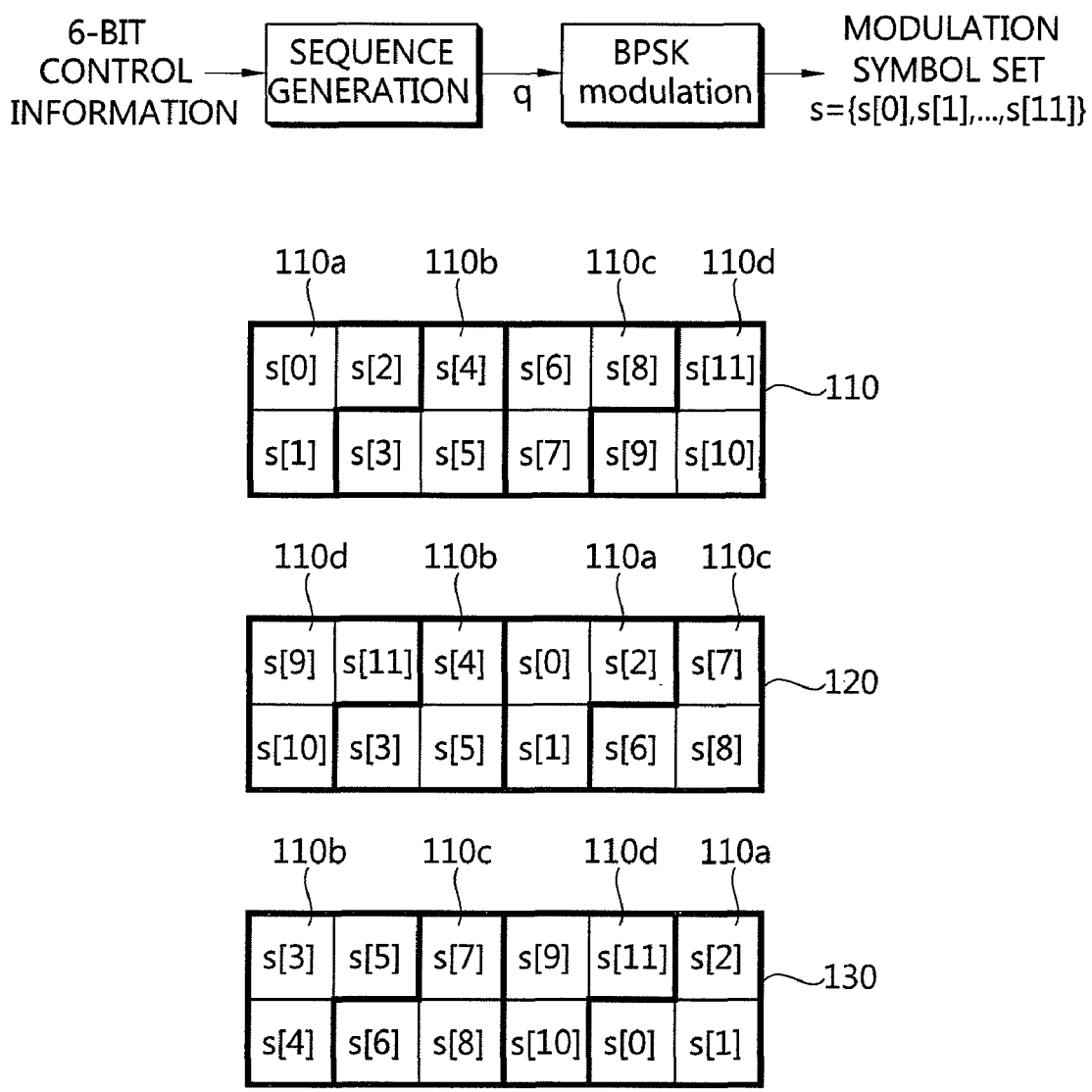
FIG. 4 shows an example of control information transmission according to an embodiment of the present invention.

FIG. 4 shows an example of control information transmission according to an embodiment of the present invention. First, a 12-bit sequence q corresponding to 6-bit control information is generated. The sequence q may be selected from a predetermined sequence set. The number of sequences included in the sequence set depends on a length of control information. 64 sequences may be predefined for the 6-bit control information. For example, the sequence q may be selected from a sequence set Q as shown in the following table.

TABLE 1

| Index | Sequence |
|---|---|
| 0 | 111111111111 |
| 1 | 101111010110 |
| 2 | 011010111101 |
| 3 | 001010010100 |
| 4 | 101010101010 |
| 5 | 111010000011 |
| 6 | 001111101000 |
| 7 | 011111000001 |
| 8 | 110011001100 |
| 9 | 100011100101 |
| 10 | 010110001110 |
| 11 | 000110100111 |
| 12 | 100110011001 |
| 13 | 110110110000 |
| 14 | 000011011011 |
| 15 | 010011110010 |
| 16 | 101011111100 |
| 17 | 111011010101 |
| 18 | 001110111110 |
| 19 | 011110010111 |
| 20 | 111110101001 |
| 21 | 101110000000 |
| 22 | 011011101011 |
| 23 | 001011000010 |
| 24 | 100111001111 |
| 25 | 110111100110 |
| 26 | 000010001101 |
| 27 | 010010100100 |
| 28 | 110010011010 |
| 29 | 100010110011 |
| 30 | 010111011000 |
| 31 | 000111110001 |
| 32 | 101011001001 |
| 33 | 111011100000 |
| 34 | 001110001011 |
| 35 | 011110100010 |
| 36 | 100111111010 |
| 37 | 110111010011 |
| 38 | 000010111000 |
| 39 | 010010010001 |
| 40 | 111110011100 |
| 41 | 101110110101 |
| 42 | 011011011110 |
| 43 | 001011110111 |
| 44 | 101010011111 |
| 45 | 111010110110 |
| 46 | 001111011101 |
| 47 | 011111110100 |
| 48 | 111111001010 |
| 49 | 101111100011 |
| 50 | 011010001000 |
| 51 | 001010100001 |
| 52 | 110110101111 |
| 53 | 100010000110 |
| 54 | 010111101101 |
| 55 | 000111000100 |
| 56 | 100110101100 |

TABLE 1-continued

| Index | Sequence |
|---|---|
| 57 | 110110000101 |
| 58 | 000011101110 |
| 59 | 010011000111 |
| 60 | 110011111001 |
| 61 | 100011010000 |
| 62 | 010110111011 |
| 63 | 000110010010 |

Subsequently, the sequence q is modulated to generate a modulation symbol set consisting of a plurality of modulation symbols. For example, in case of using binary phase shift keying (BPSK) modulation, a modulation symbol set s={s[0], s[1], . . . , s[11]} consisting of 12 modulation symbols may be generated from the sequence q having a length of 12.

The modulation symbol set is repeated and is then mapped to each of mini units 110, 120, and 130. By arranging a sequence differently for each of the mini units 110, 120, and 130, time diversity gain and frequency diversity gain are obtained. A modulation symbol set s is divided into 4 subgroups 110a, 110b, 110c, and 110d each having a size of 3. Herein, the first subgroup 110a includes {s[0], s[1], s[2]}, the second subgroup 110b includes {s[3], s[4], s[5]}, the third subgroup 110c includes {s[6], s[7], s[8]}, and the fourth subgroup 110d includes {s[9], s[10], s[11]}. In each mini unit, two subgroups are mapped to two contiguous subcarriers over three OFDM symbols. In the first mini unit 110, the modulation symbol set s is directly mapped to a subcarrier indexed in a frequency-first order. Mapping to the subcarrier may be expressed by $f[j]=s[j]$ ($0 \leq j \leq 11$).

In the second mini unit 120, the modulation symbol set s is mapped by reordering it in a subgroup unit. When the modulation symbol set s is a reference modulation symbol set, a first reordered modulation symbol set s' is {s[9], s[10], s[11], s[3], s[4], s[5], s[0], s[1], s[2], s[6], s[7], s[8]}. s'[j] may be expressed by $s'[j]=s[K_1[j]]$, where $K_1[j]$ is a j-th element of $K_1=\{9,10,11,3,4,5,0,1,2,6,7,8\}$. Mapping to the subcarrier may be expressed by $f[j]=s'[j]$ ($0 \leq j \leq 11$).

In the third mini unit 130, the modulation symbol set s is mapped by reordering it in a subgroup unit. A second reordered modulation symbol set s" is {s[3], s[4], s[5], s[6], s[7], s[8], s[9], s[10], s[11], s[0], s[1], s[2]}. s"[j] may be expressed by $s[K_2[j]]$, where $K_2[j]$ is a j-th element of $K_2=\{3,4,5,6,7,8,9,10,11,0,1,2\}$. Mapping to the subcarrier may be expressed by $f[j]=s"[j]$ ($0 \leq j \leq 11$).

The number of bits of control information, the length of the sequence q, and BPSK modulation are for exemplary purposes only, and can be easily modified by those skilled in the art. For example, quadrature phase shift keying (QPSK) modulation may be used. In this case, even if the number of bits of the control information is 12 bits, the modulation symbol set s may include 12 modulation symbols.

Figure 5:
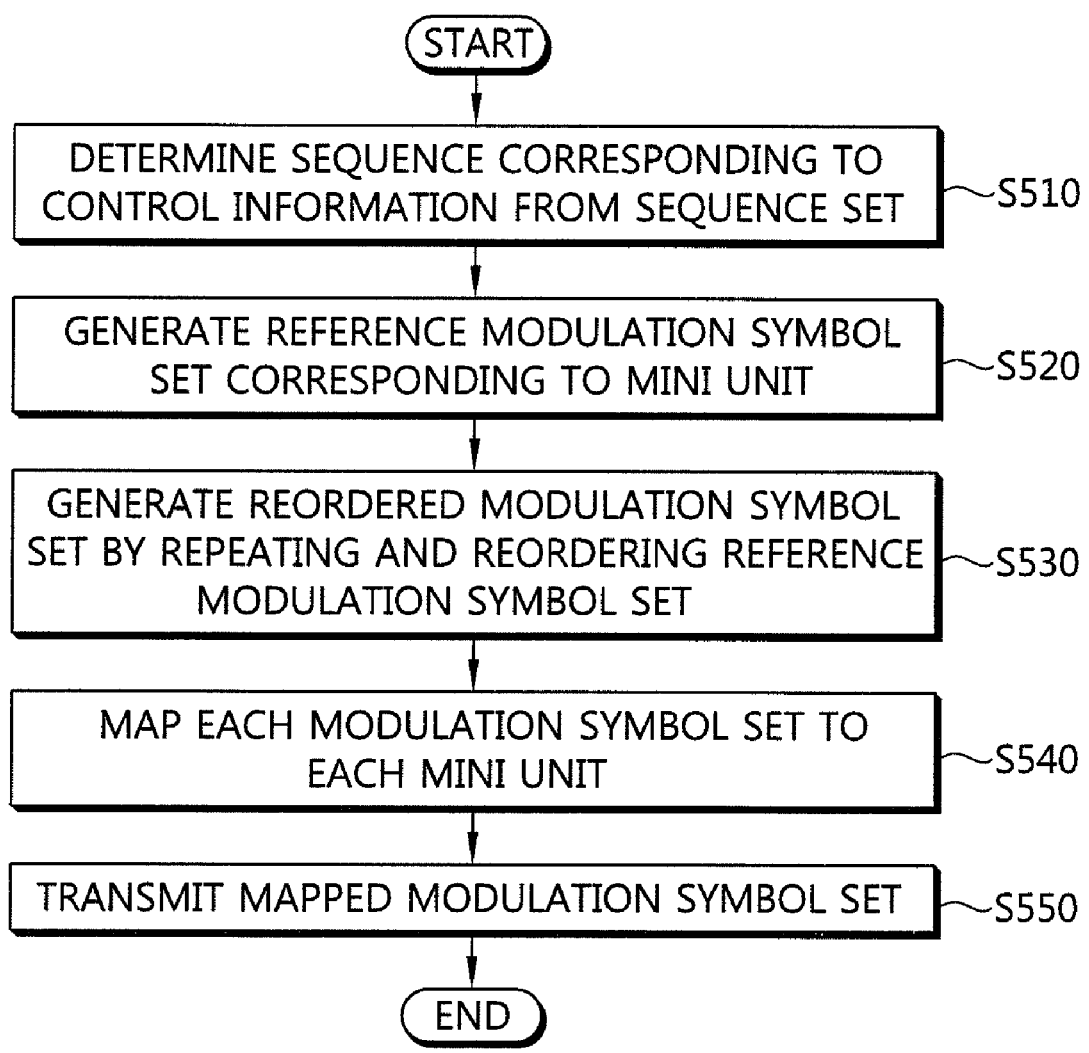
FIG. 5 is a flowchart showing a method of transmitting control information according to an embodiment of the present invention.

FIG. 5 is a flowchart showing a method of transmitting control information according to an embodiment of the present invention. This method may be performed by a transmitter. When uplink control information is transmitted, this method may be performed by an MS. In step S510, a sequence q corresponding to the control information is determined from a sequence set. For example, the sequence q corresponding to 6-bit control information may be selected from the sequence set Q of Table 1.

In step S520, the sequence is modulated to generate a reference modulation symbol set s corresponding to one mini unit. When BPSK modulation is performed on the sequence q of 12 bits, a modulation symbol set s={s[0], s[1], ..., s[11]} including 12 modulation symbols can be generated.

In step S530, the reference modulation symbol set is repeated and reordered to generate reordered modulation symbol sets s' and s" so that the number of modulation symbol sets is equal to the number of a plurality of mini units included in the resource unit. The reordered modulation symbol sets s' and s" are reordered in a subgroup unit.

In step S540, the reference modulation symbol set s and the reordered modulation symbol sets s' and s" are mapped respectively to the plurality of mini units included in the resource unit.

In step S550, the mapped modulation symbol sets are transmitted in the resource unit.

Figure 6:
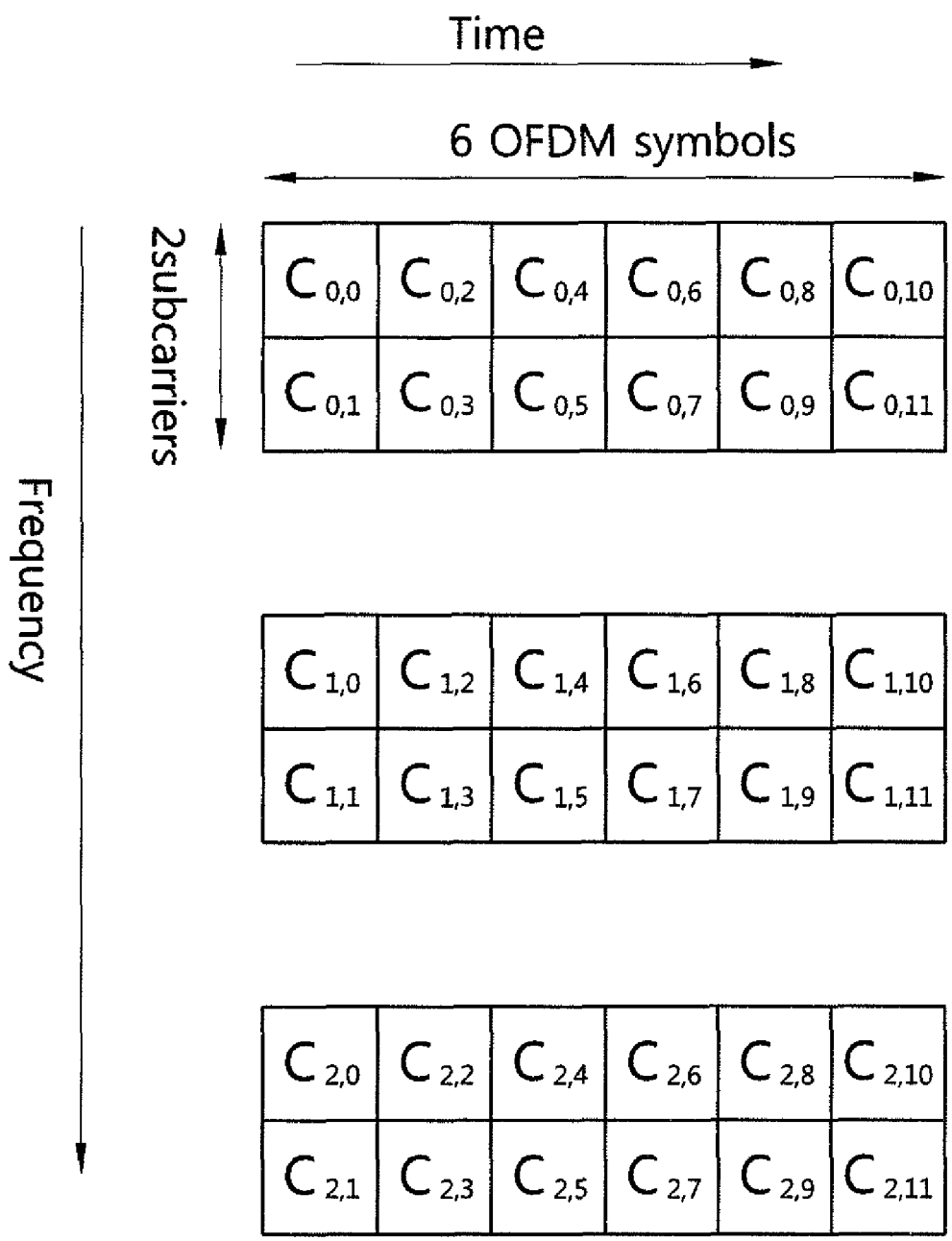
FIG. 6 shows another example of control information transmission according to an embodiment of the present invention.

FIG. 6 shows another example of control information transmission according to an embodiment of the present invention. The embodiment of FIG. 6 differs from the embodiment of FIG. 4 only in terms of notation, and sequence reordering is practically identical. It is assumed that a modulation symbol set s={s[0], s[1], ..., s[11]} is obtained from a sequence corresponding to control information, and subcarriers of each mini unit are indexed in a frequency-first order. In an i-th mini unit, mapping to a j-th subcarrier $C_{i,j}$ is performed as shown:

$$C_{i,j}=s[K_i[j]], \text{ for } i=0,1,2, 0 \leq j \leq 11 \qquad \text{Equation 1}$$

where s[k] is a k-th modulation symbol in a modulation symbol set s, $K_i[j]$ denotes an j-th element of $K_i$, $K_0$={0,1,2,3,4,5,6,7,8,9,10,11}, $K_1$={9,10,11,3,4,5,0,1,2,6,7,8}, and $K_2$={3,4,5,6,7,8,9,10,11,0,1,2}.

Figure 7:
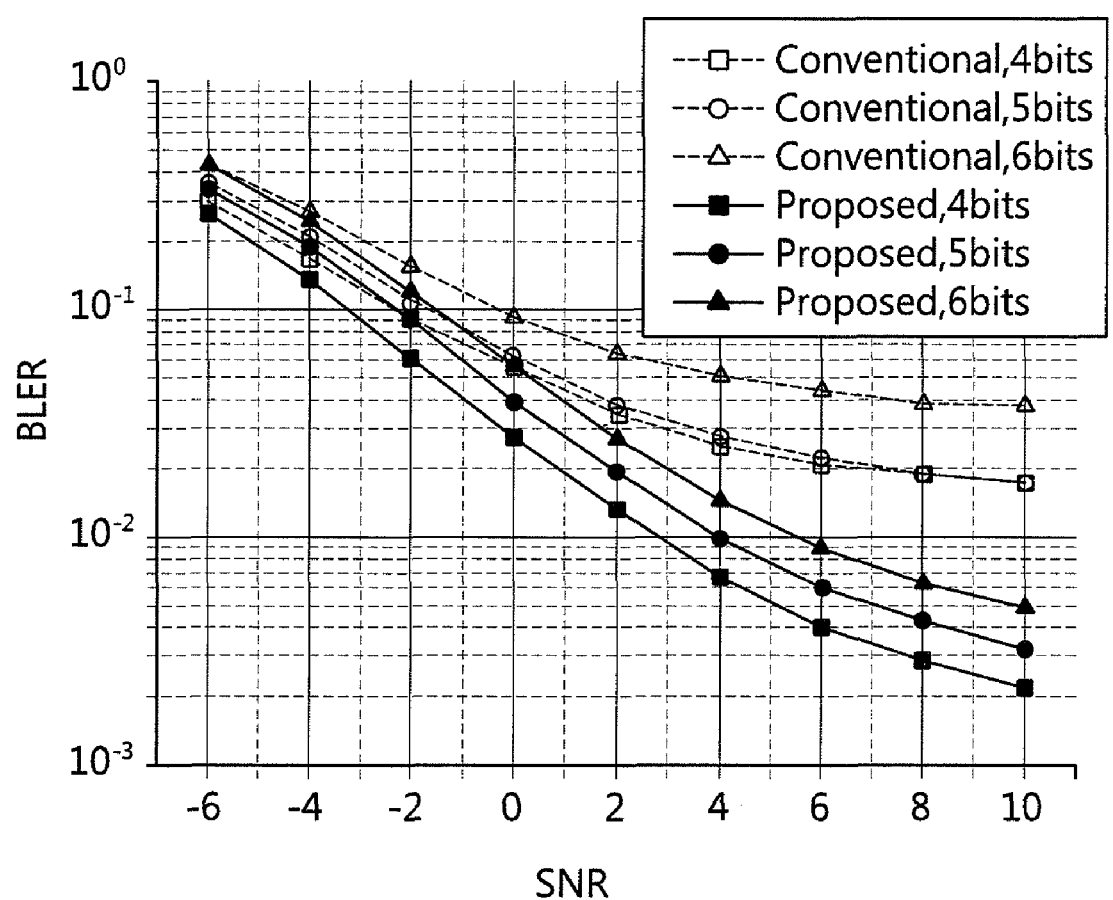
FIG. 7 is a graph comparing a proposed method with a conventional method.

FIG. 7 is a graph comparing a proposed method with a conventional method. In this graph, a block error rate (BLER) is compared with respect to a signal-to-noise ratio (SNR) in a channel model in which a speed of an MS is 350 Km/h. 'Proposed' denotes the proposed method used when control information is 4, 5, 6 bits. 'Conventional' denotes the conventional method in which the same sequence is repetitively used when the control information is 4, 5, and 6 bits. According to the conventional method, an error floor occurs in which the BLER is no longer decreased even if the SIR is increased. According to the proposed method, the BLER is significantly decreased as the SNR is increased.

According to the proposed method, performance is improved by more than 8 dB in a condition where the speed of the MS is high. Therefore, transmission reliability of control information can be ensured when the MS has high mobility. Further, an additional operation is not required in sequence reordering, and thus performance can be improved without increase of complexity.

Figure 8:
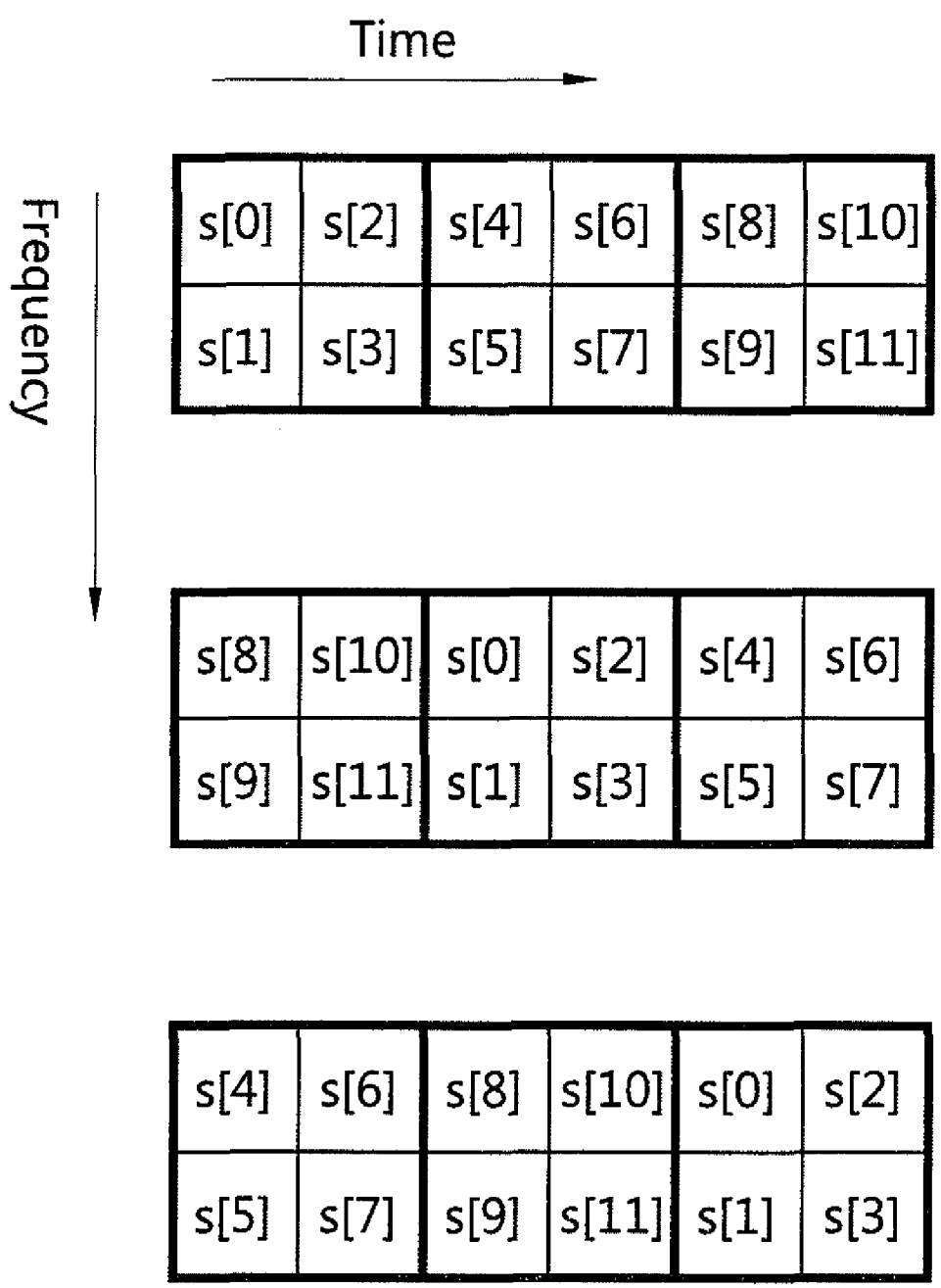
FIG. 8 to FIG. 26 show various embodiments of sequence reordering.
Figure 9:
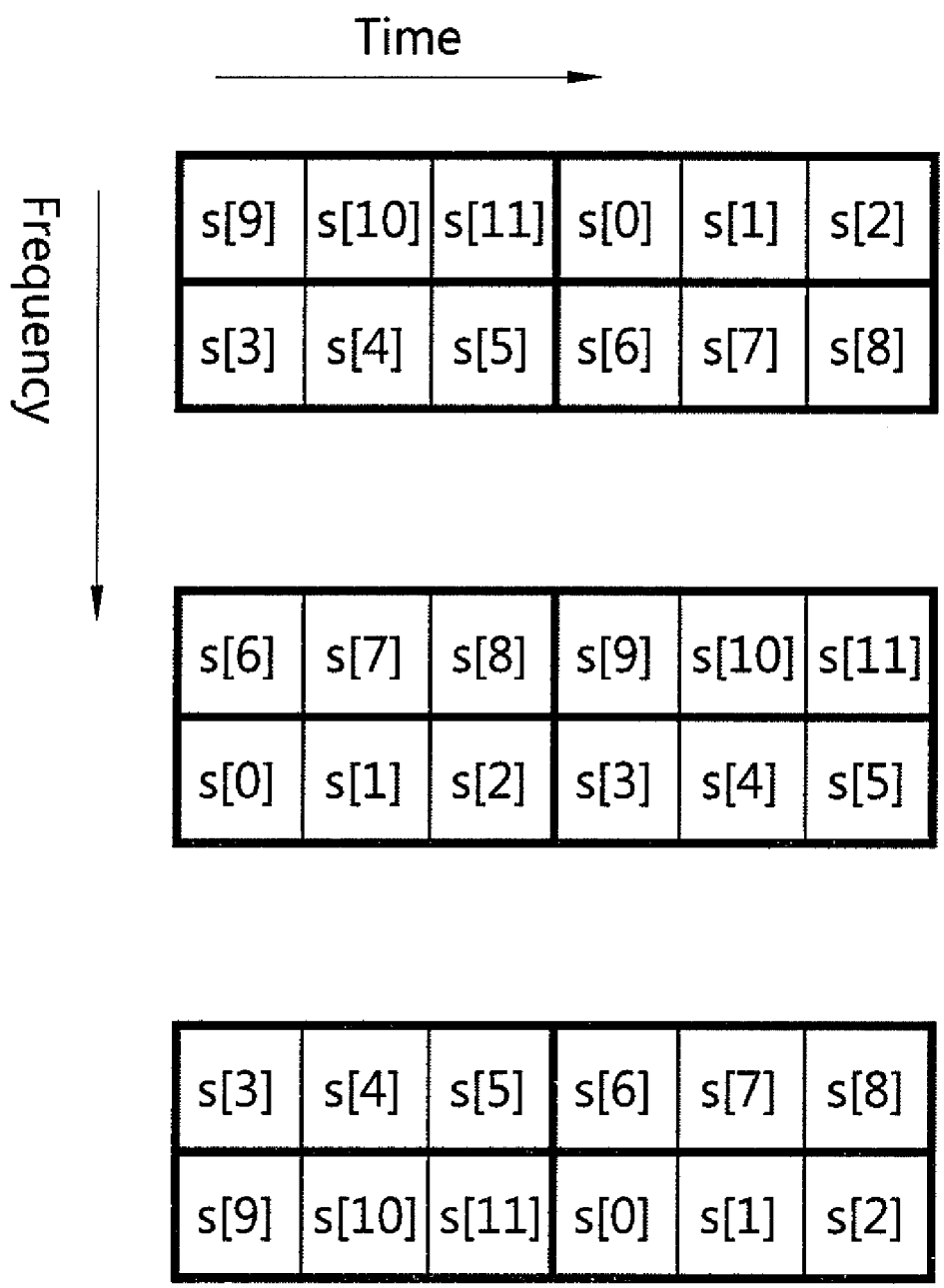
Figure 10:
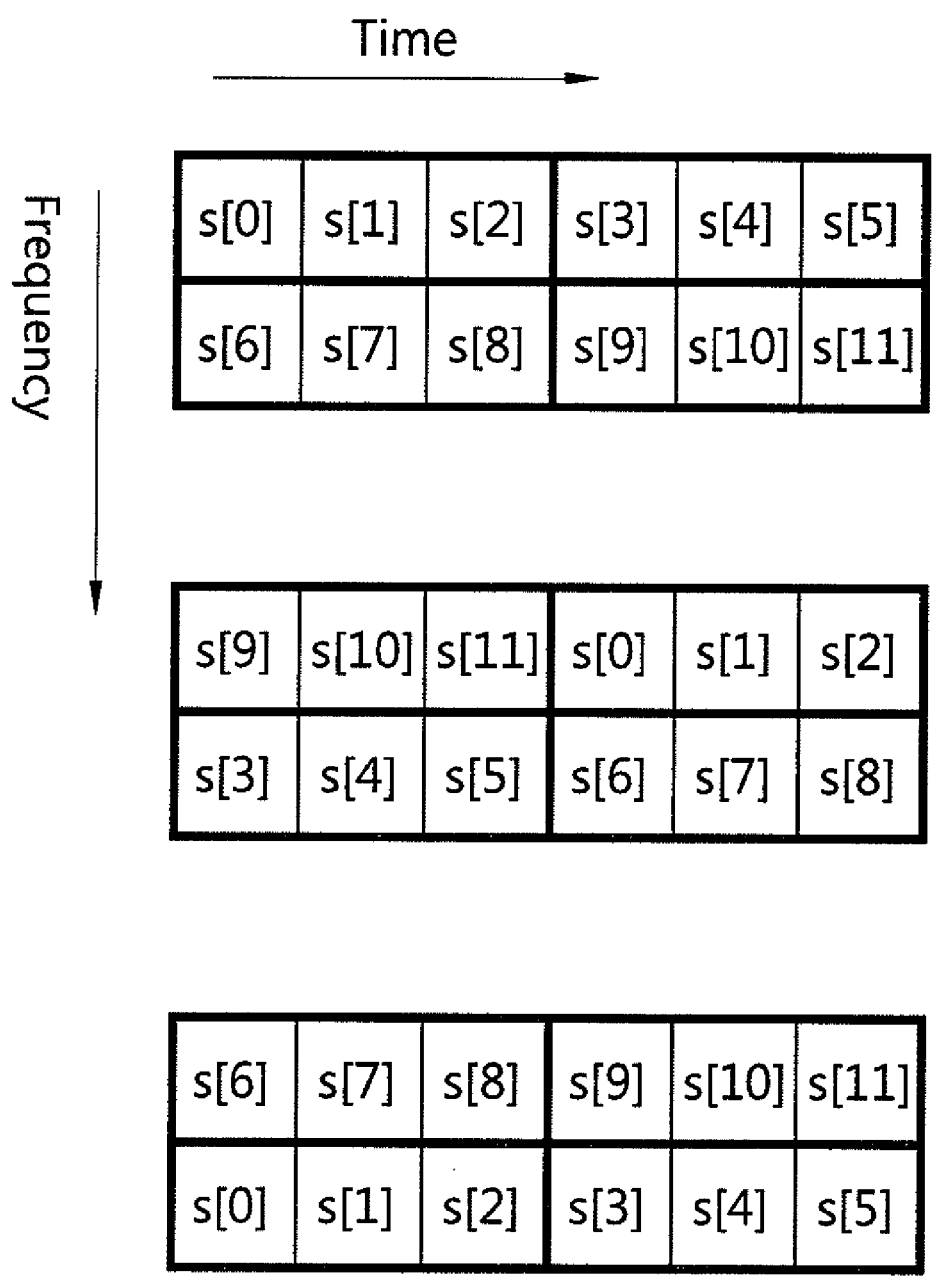
Figure 11:
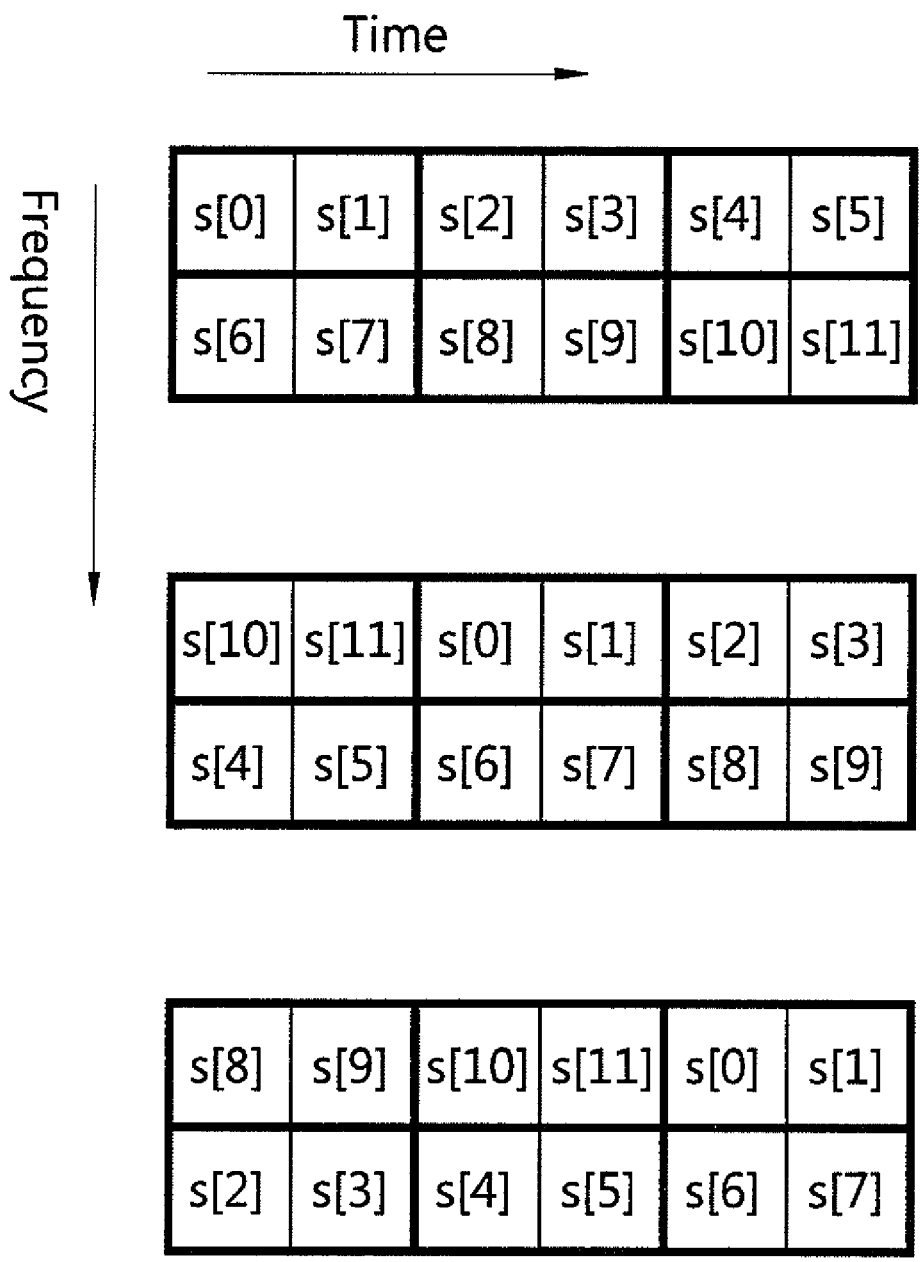
Figure 12:
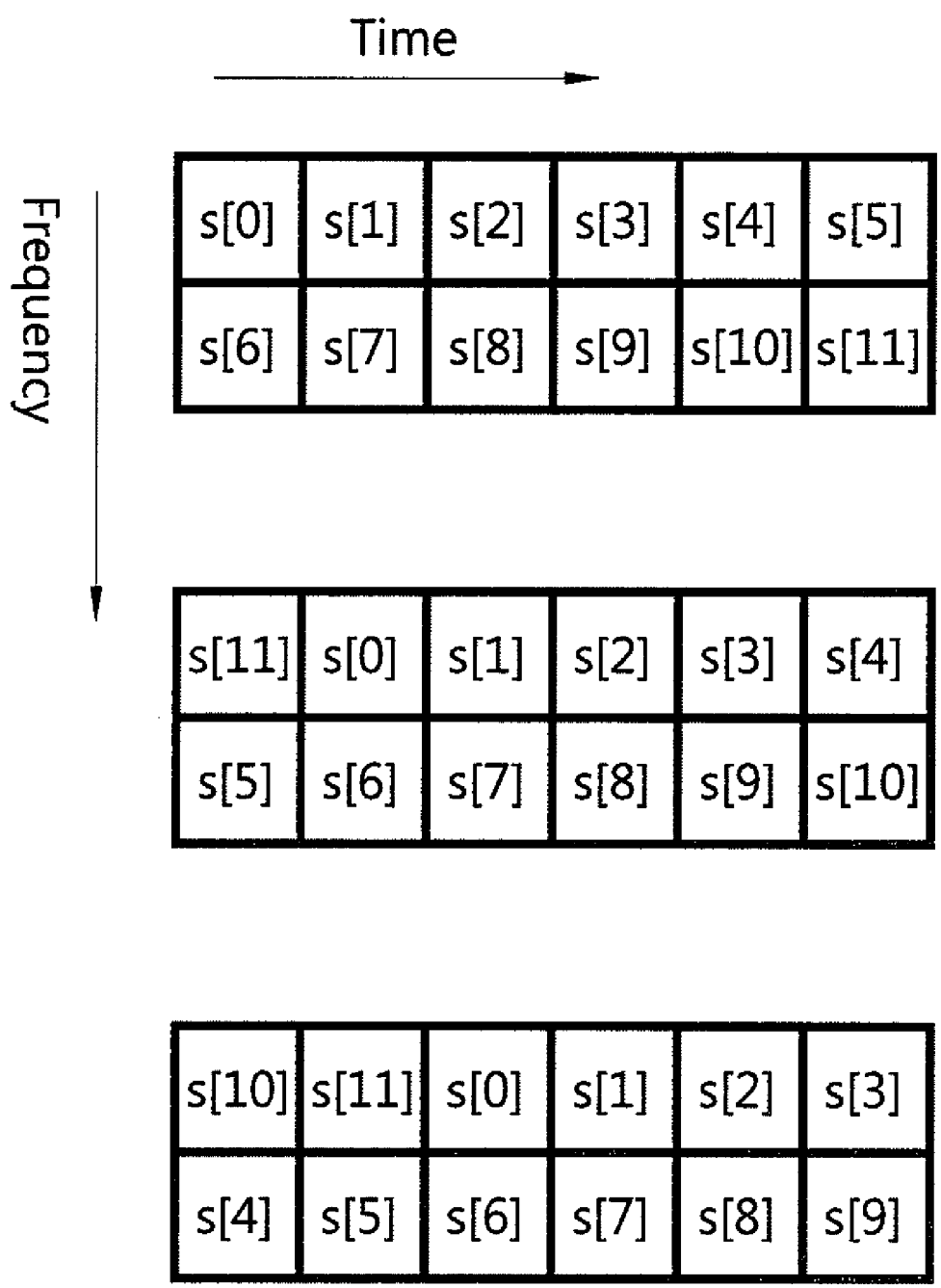
Figure 13:
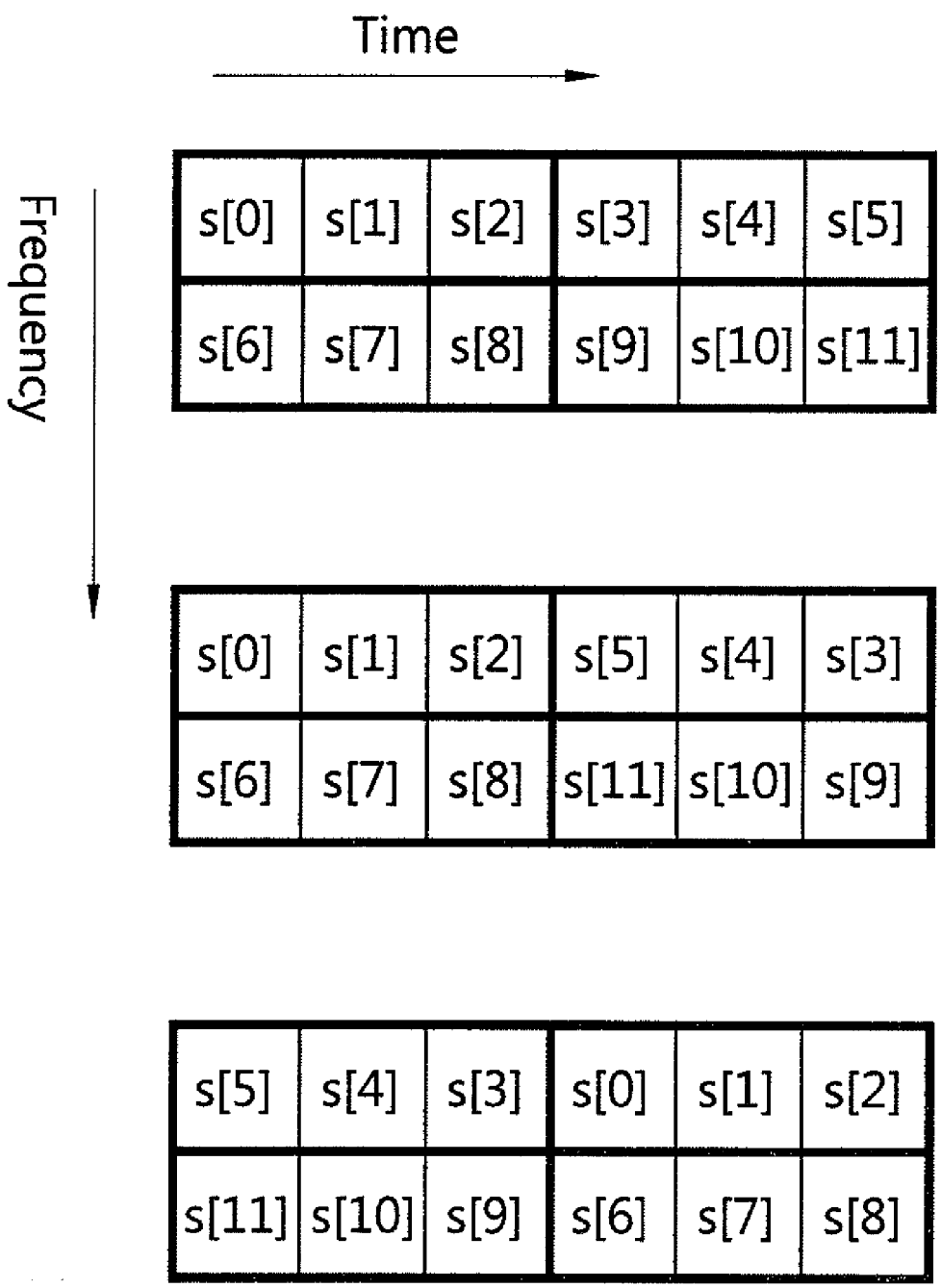
Figure 14:
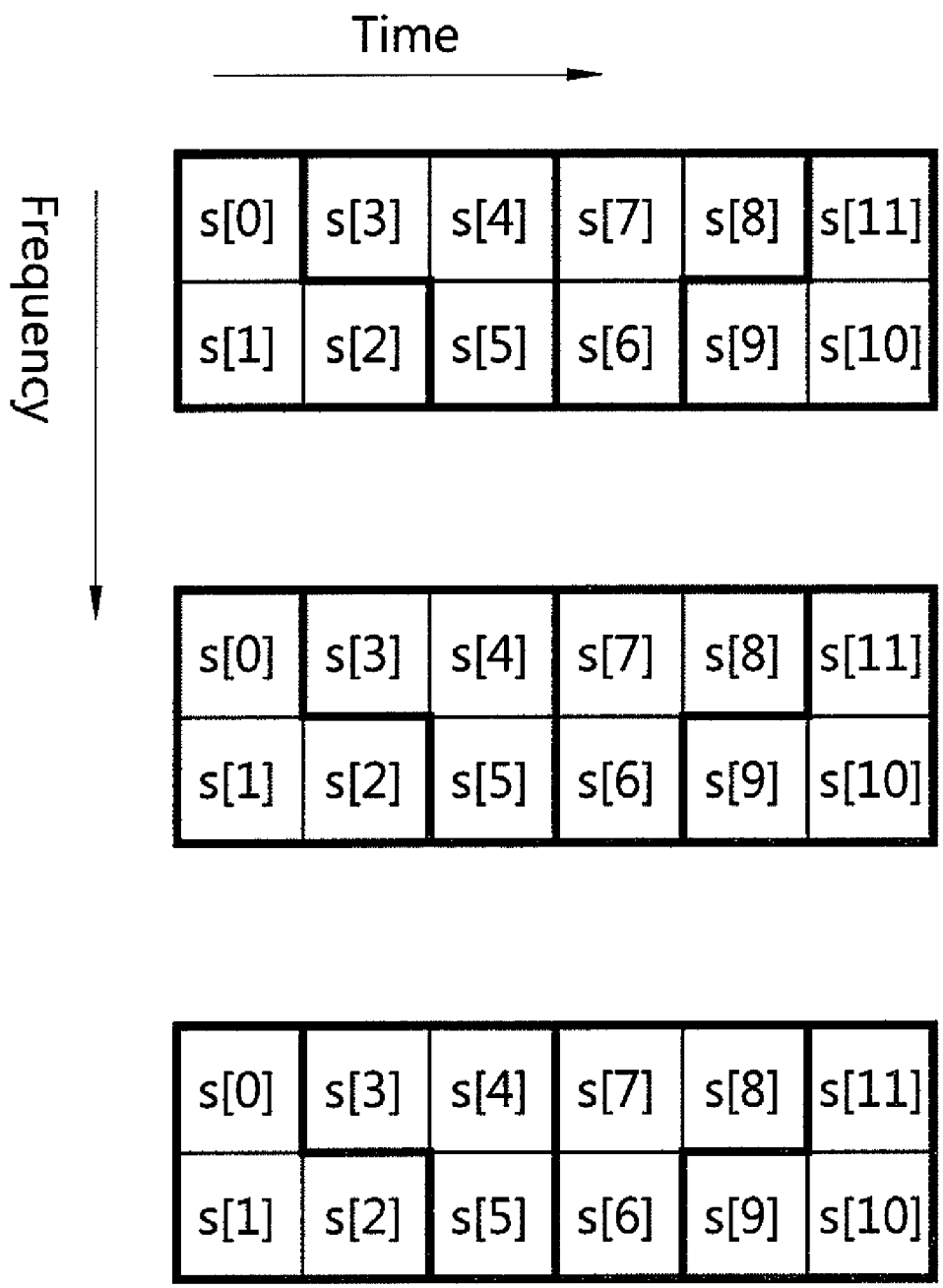
Figure 15:
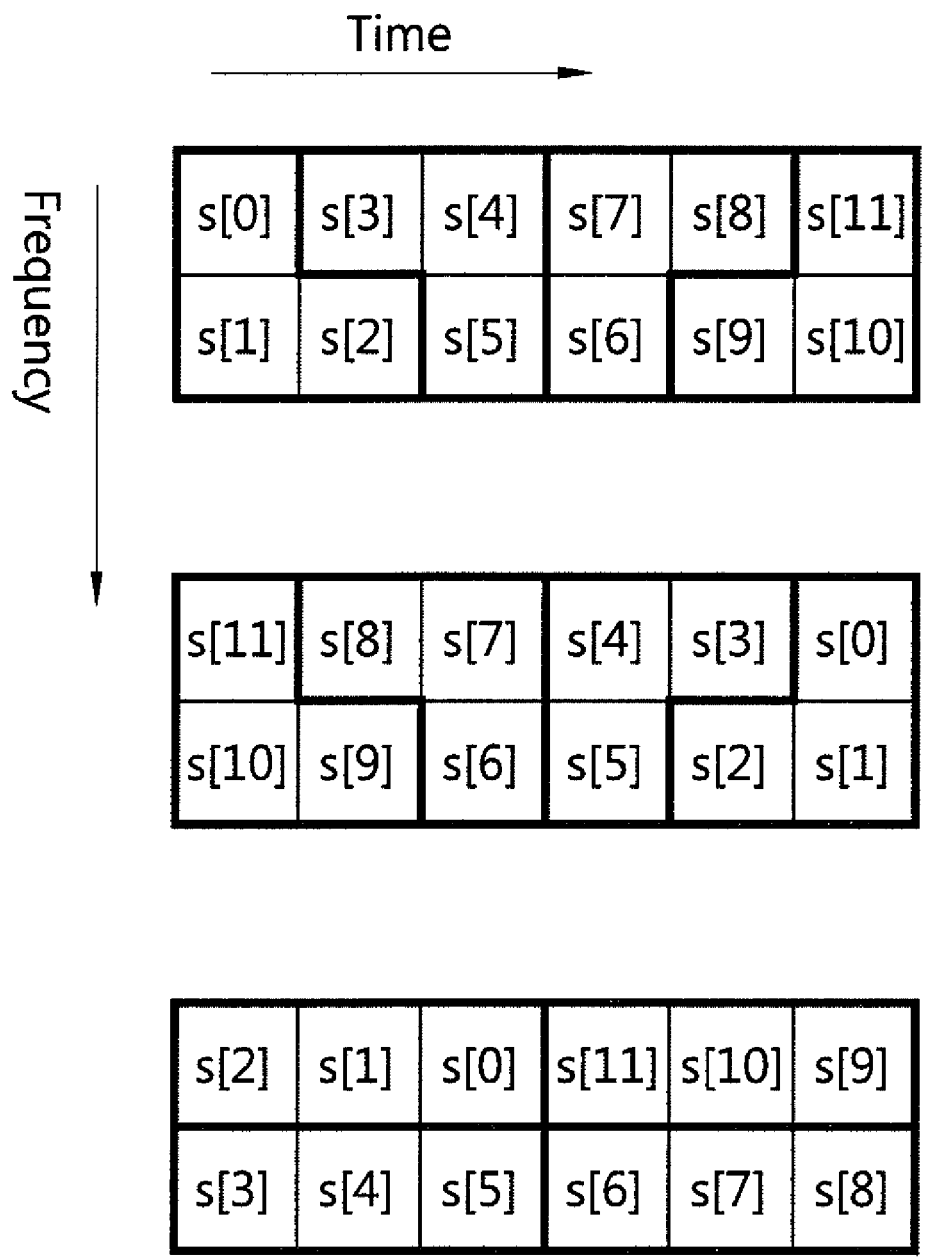
Figure 16:
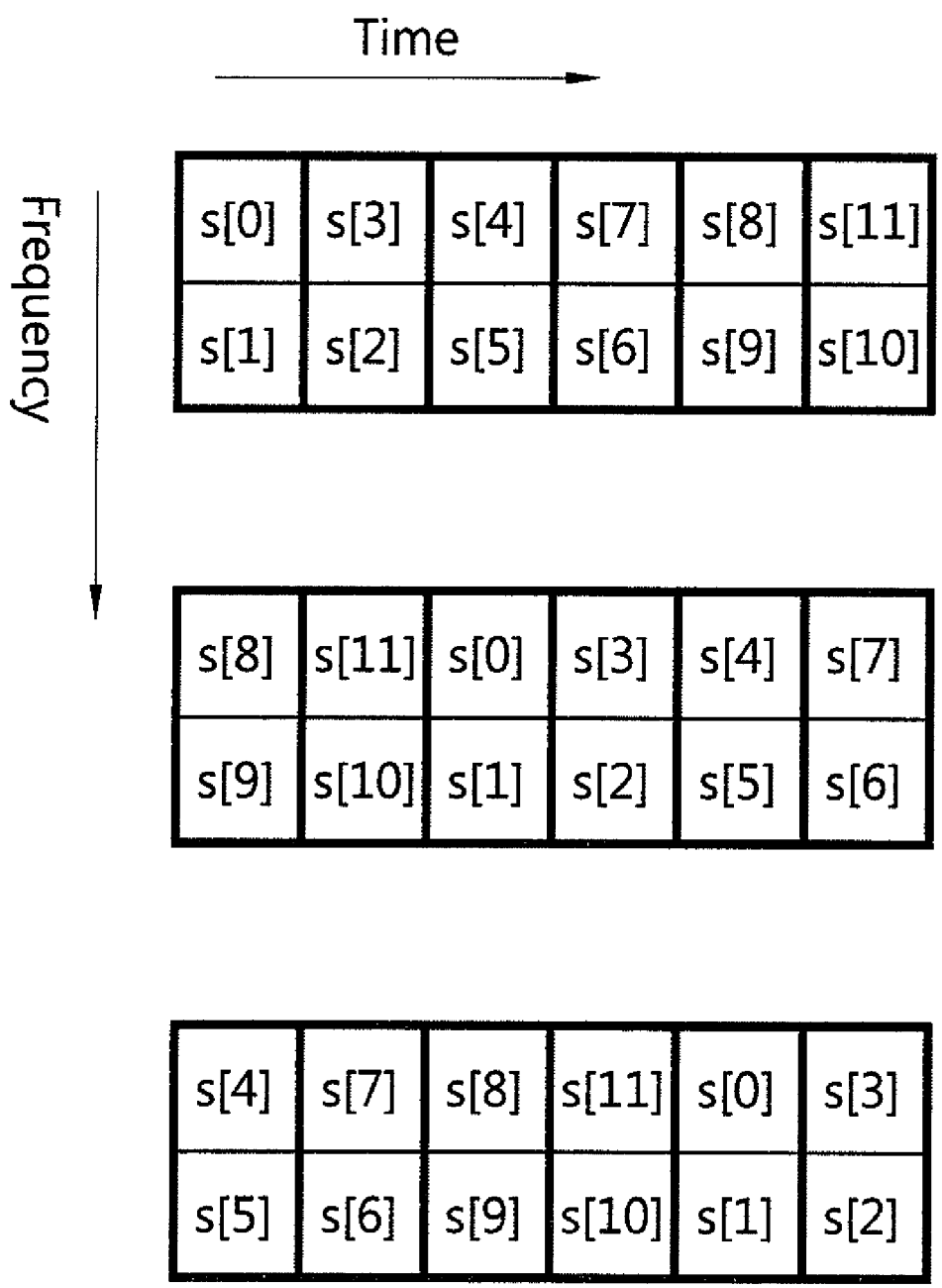
Figure 17:
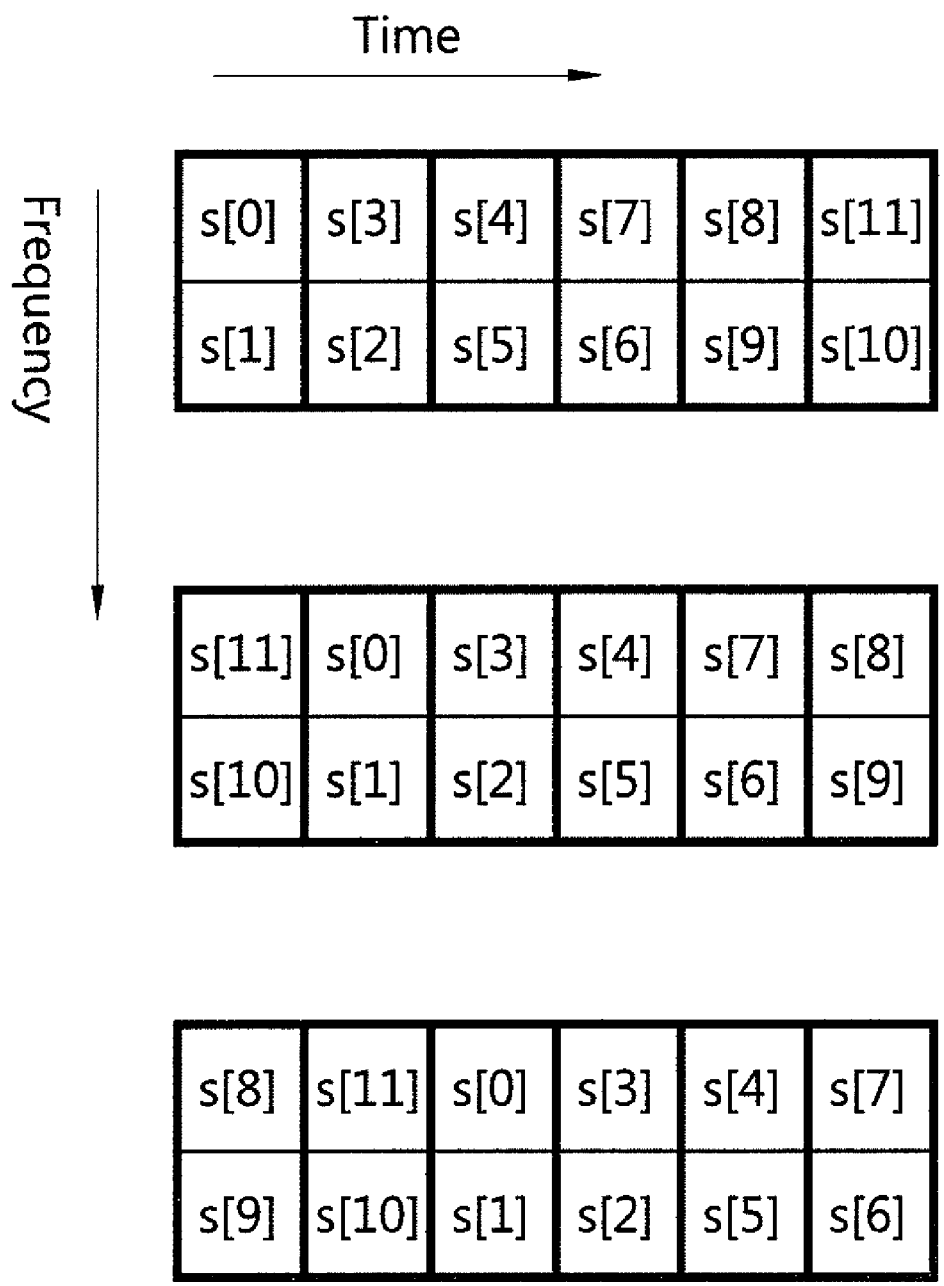
Figure 18:
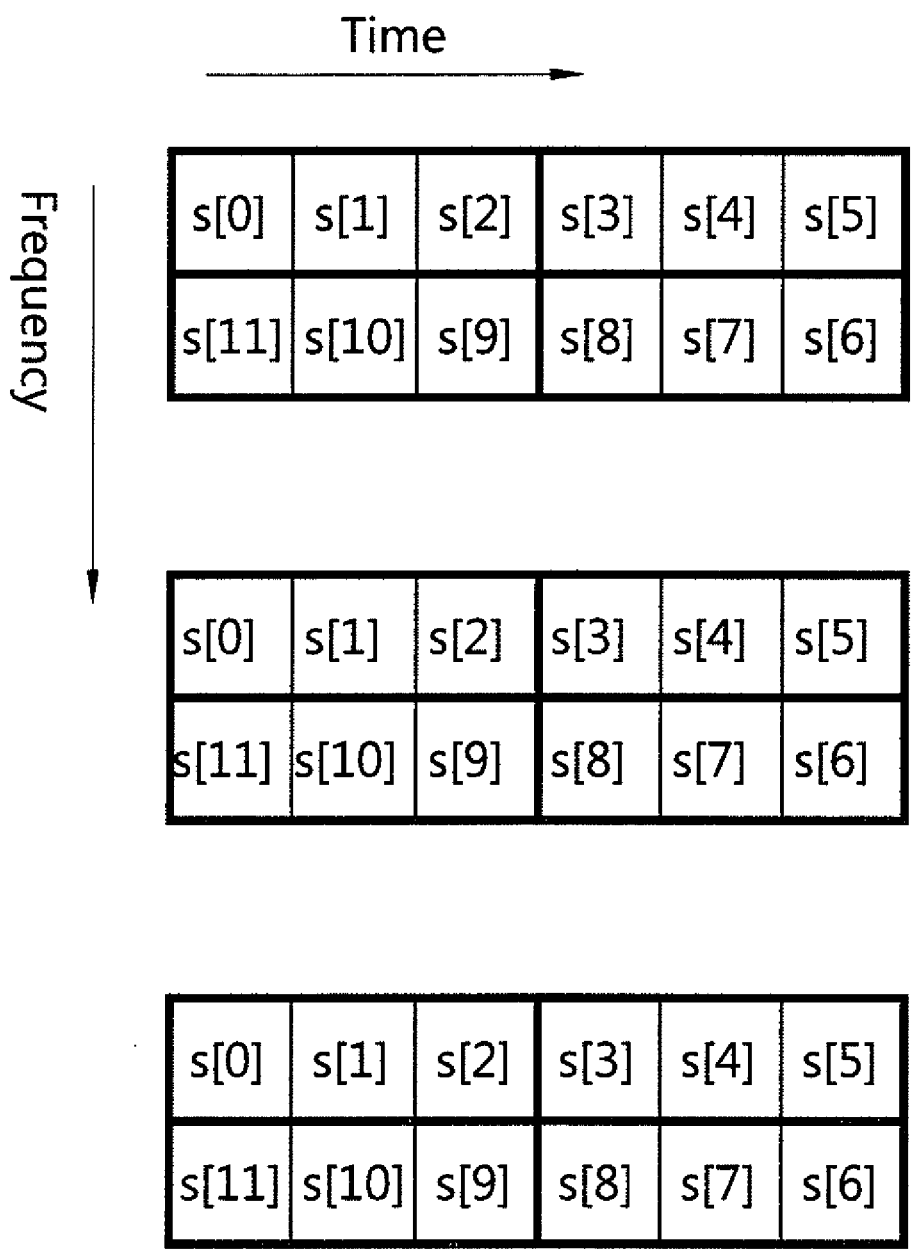
Figure 19:
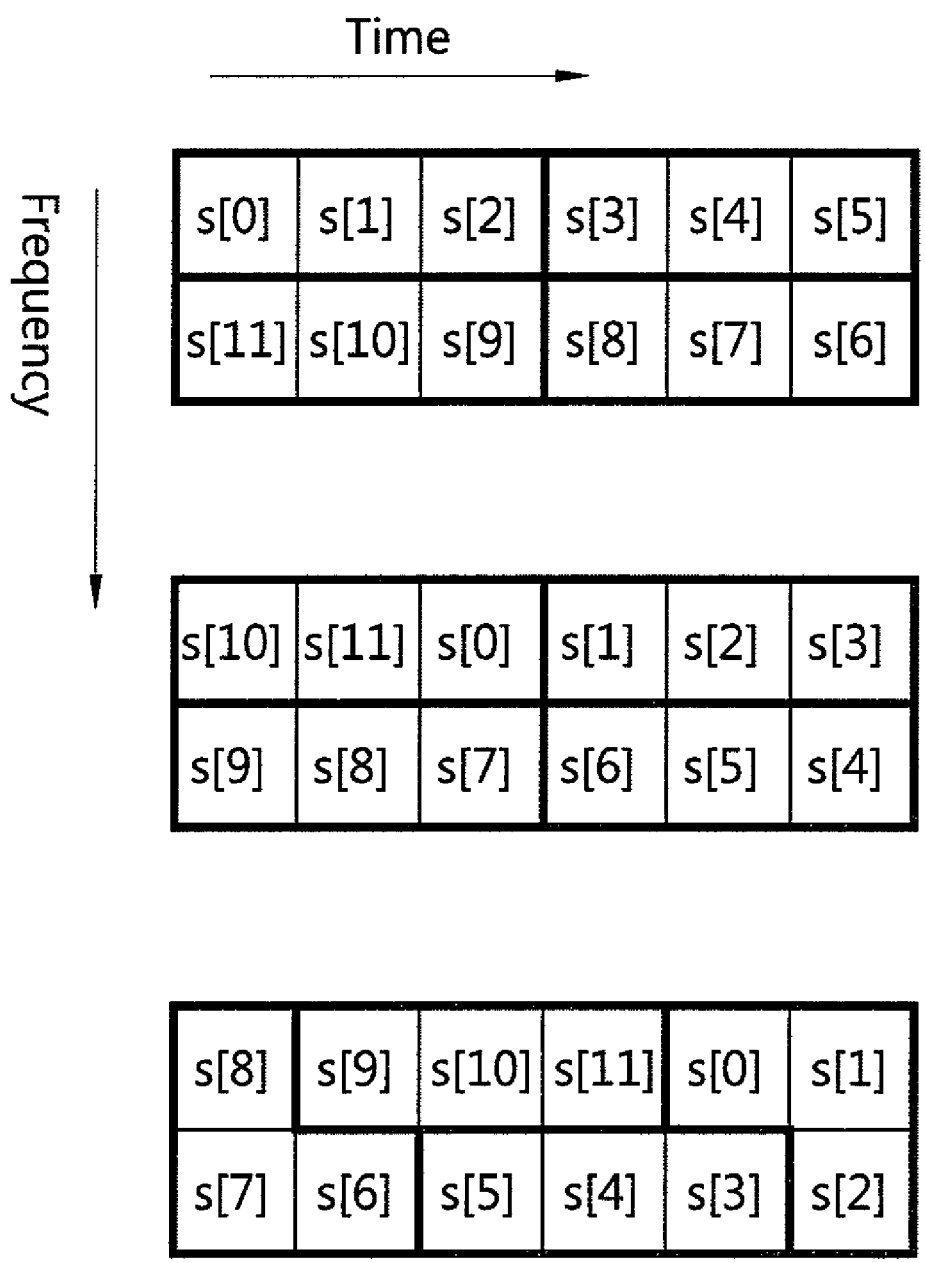
Figure 20:
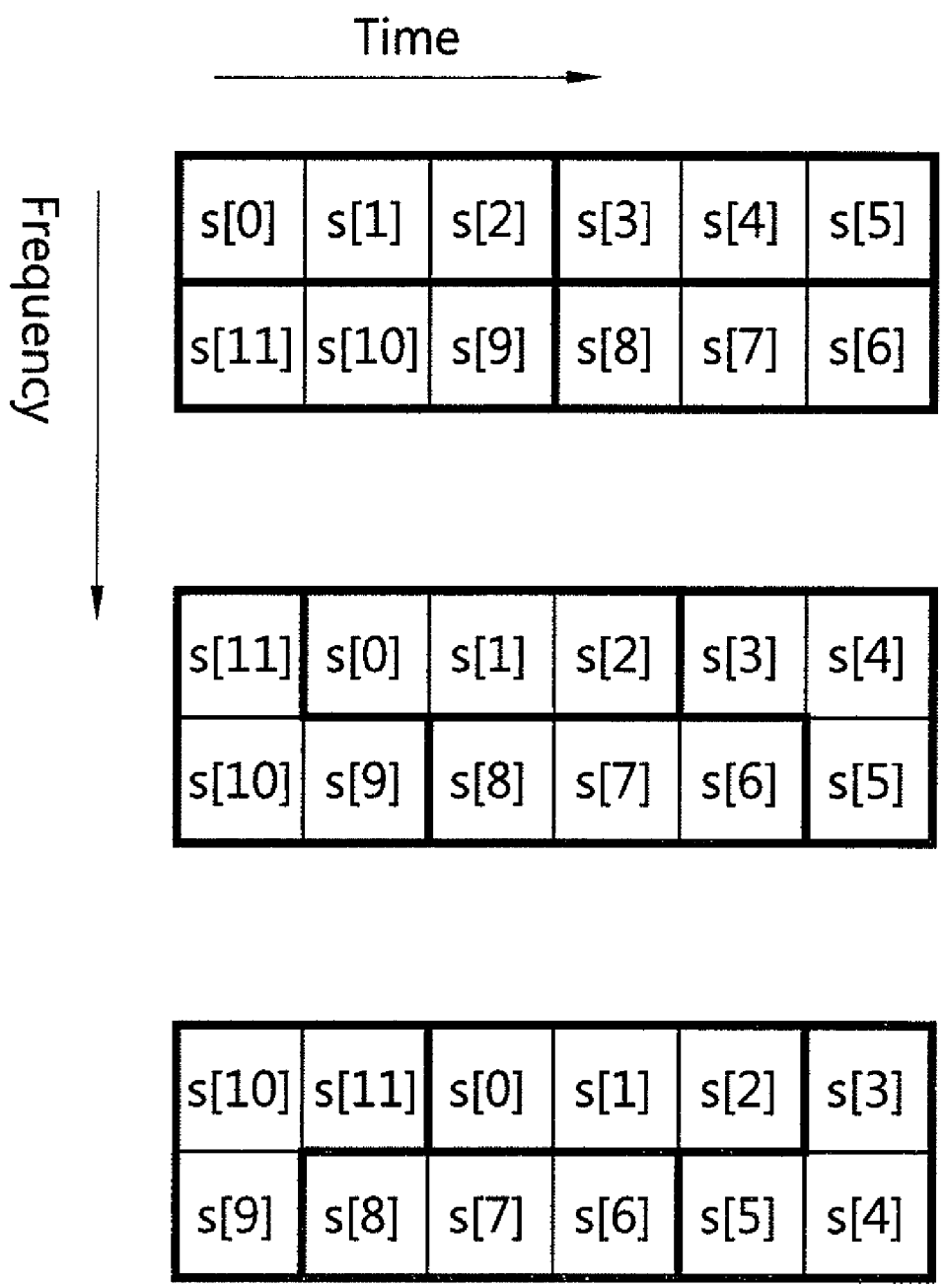
Figure 21:
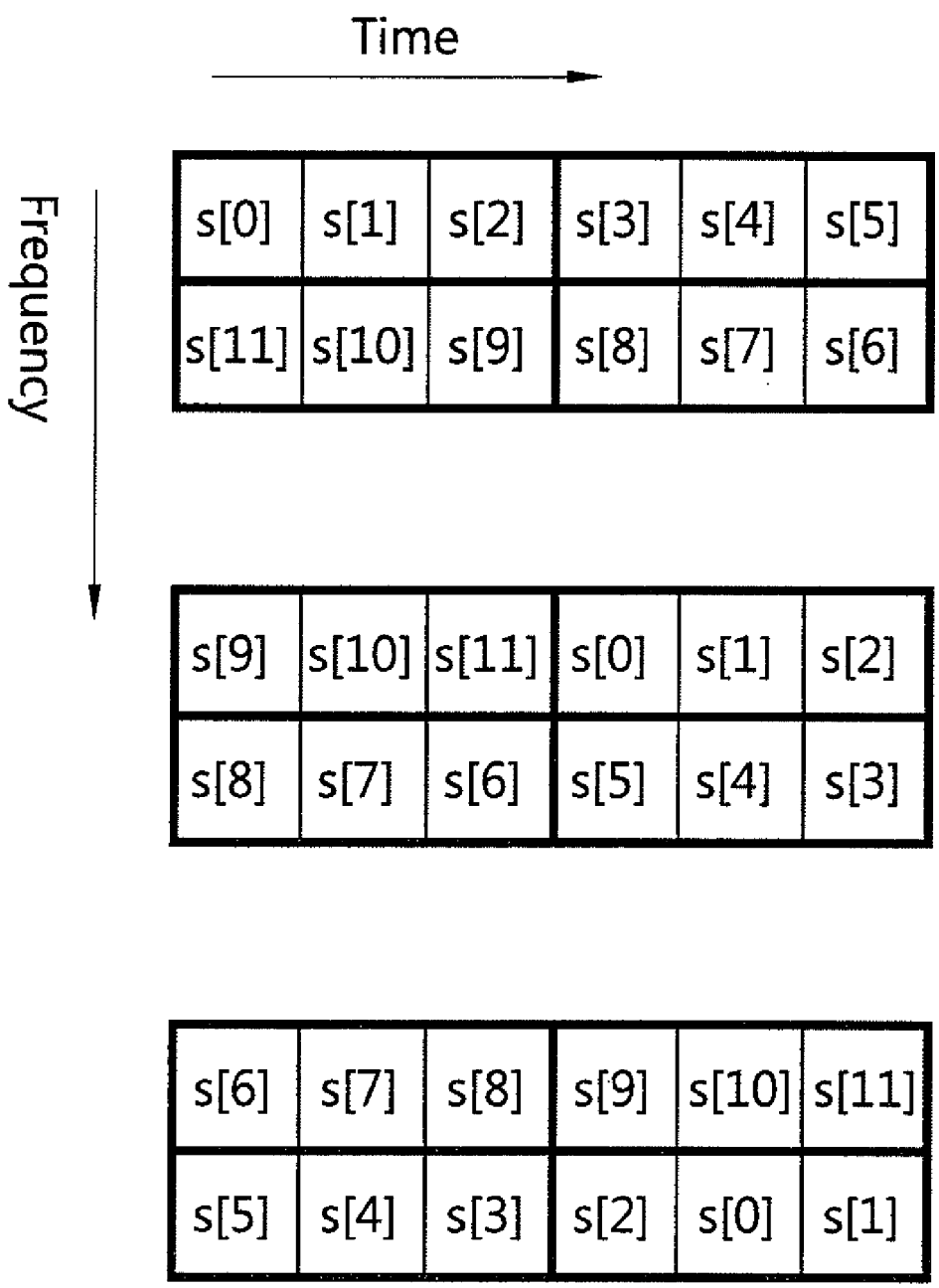
Figure 22:
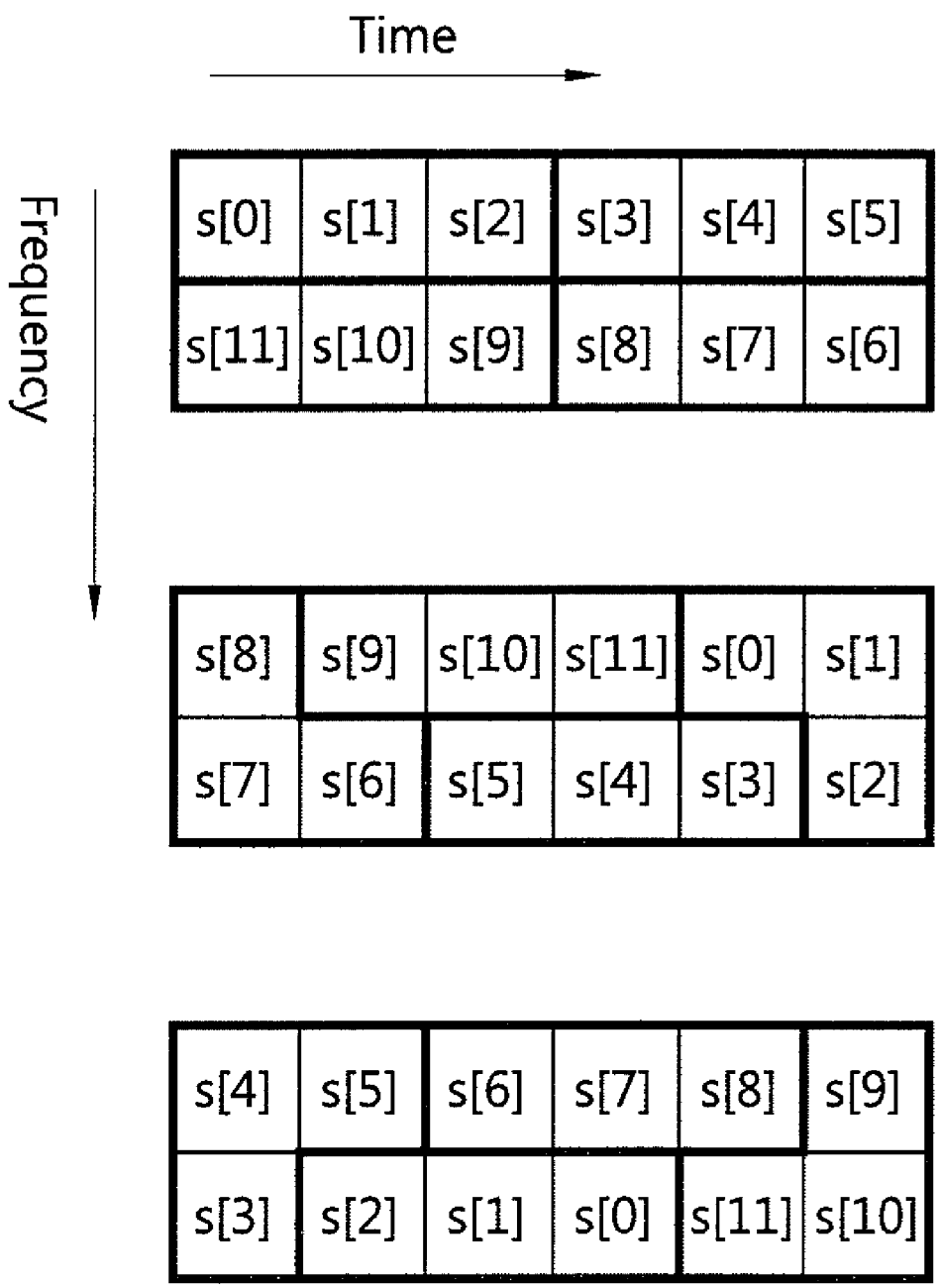
Figure 23:
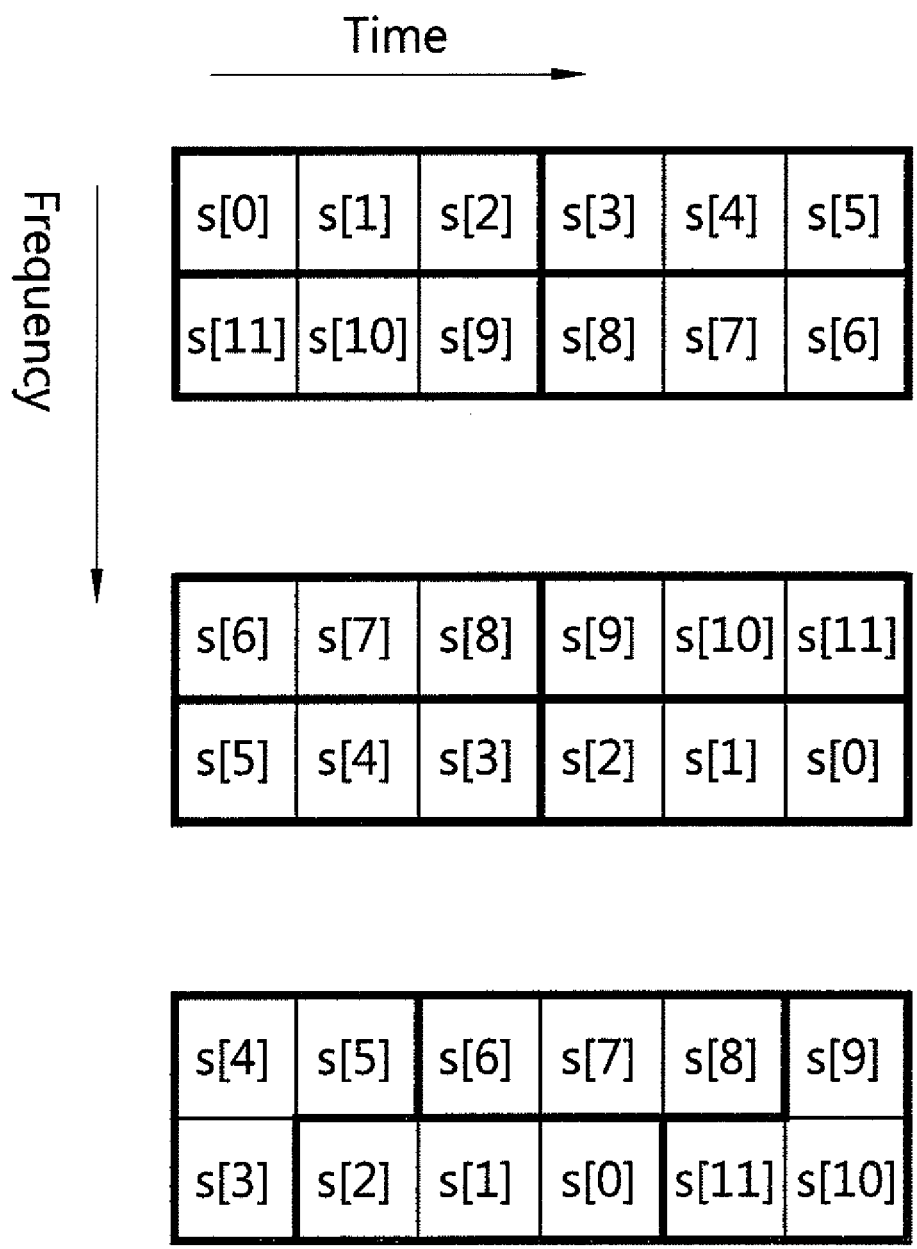
Figure 24:
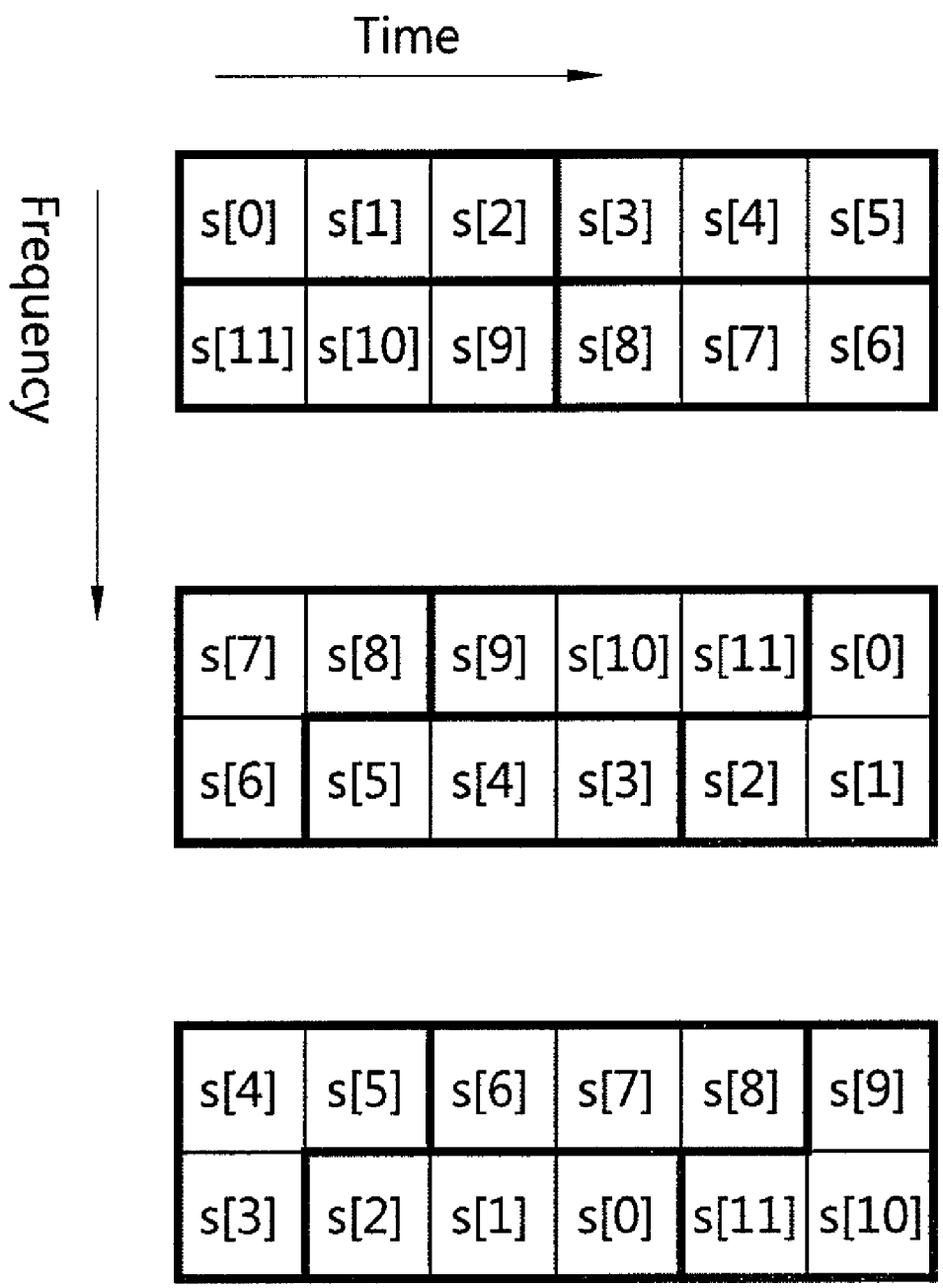
Figure 25:
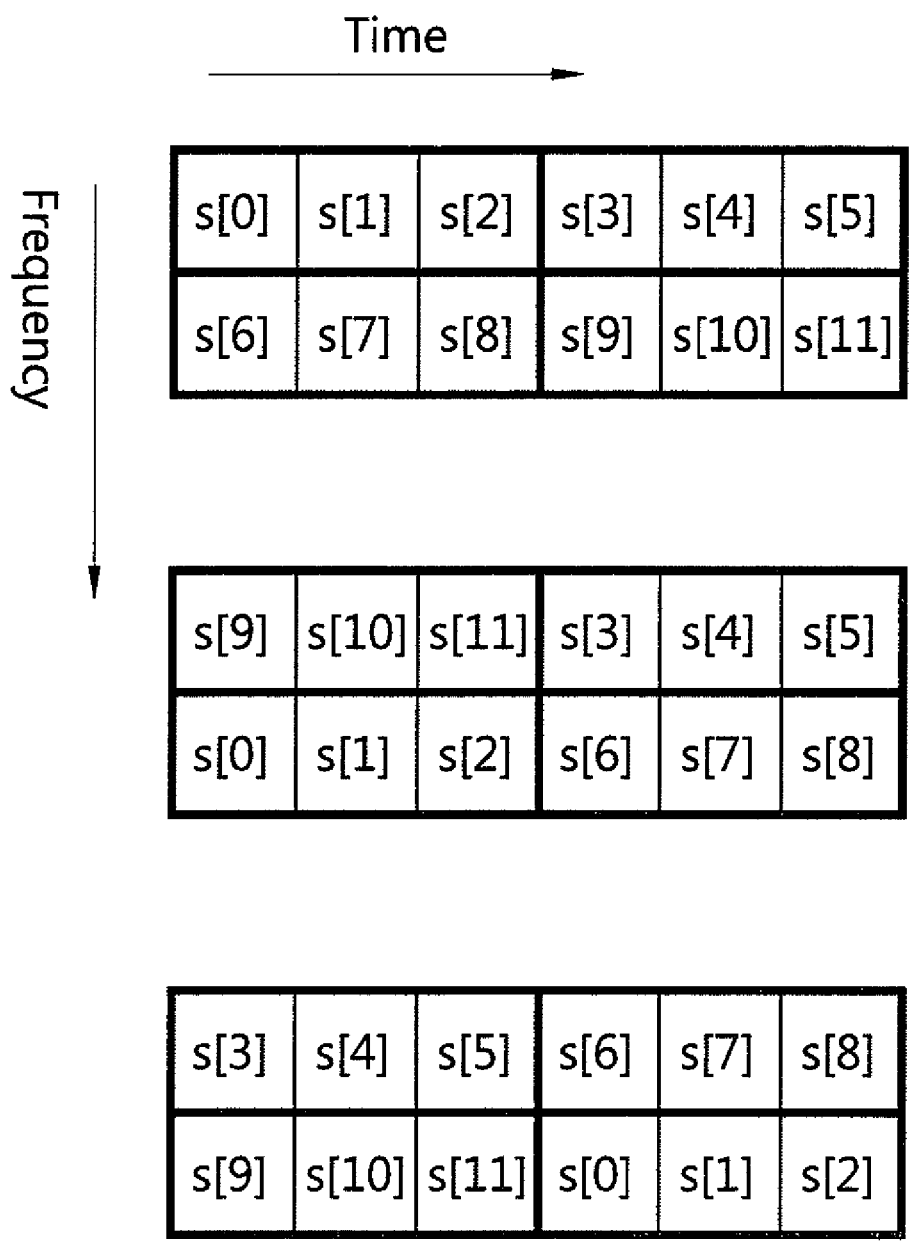
Figure 26:
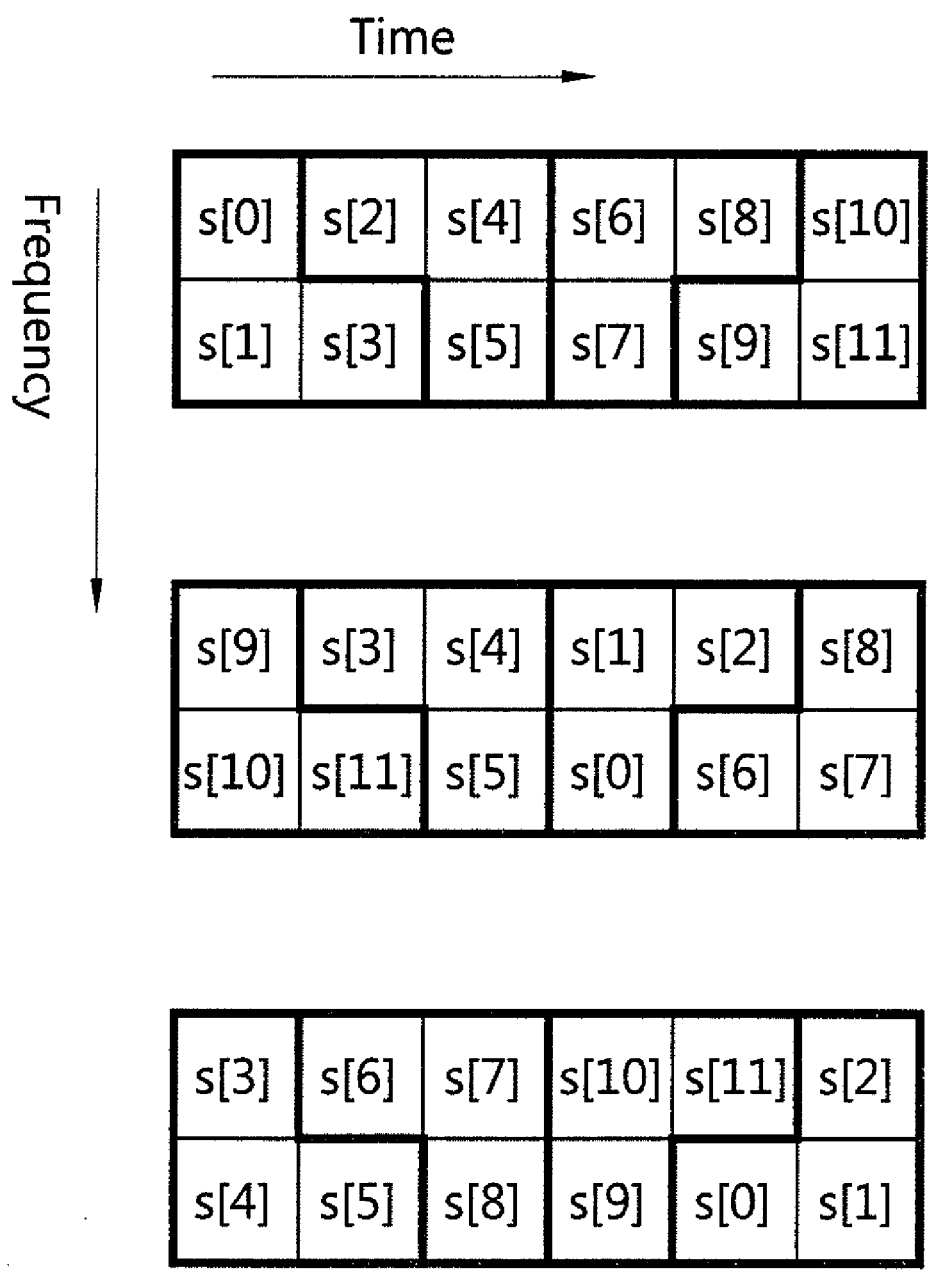

FIG. 8 to FIG. 26 show various embodiments of sequence reordering. In the embodiment of FIG. 8, a modulation symbol set is divided into 3 subgroups each having a size of 4, and each subgroup is mapped to 2 OFDM symbol×2 subcarriers included in a mini unit. The number of divided subgroups may be equal to the number of mini units included in a resource unit, and each subgroup may be mapped to each mini unit without overlapping. In addition, modulation symbols belonging to one subgroup are uniformly distributed in a time domain and a frequency domain. Embodiments of FIG. 9 to FIG. 26 vary depending on a size of a subgroup and a size of a resource allocated to the subgroup.

In the aforementioned embodiments, indexing of modulation symbols belonging to a modulation symbol set and indexing of subcarriers included in a mini unit are for exemplary purposes only. Subcarrier indices may be indexed in at least one of a frequency-first order, a time-first order, a frequency-staggered order, and a time-staggered order or in any other orders.

When a change occurs in a configuration of a resource unit and/or a mini unit, the embodiments of FIG. 3 to FIG. 26 may be modified. For example, when the mini unit consists of 6 subcarriers in a frequency domain over 2 OFDM symbols in time domain, the aforementioned embodiments may be implemented in such a manner that frequency and time are changed with each other.

Transmission reliability of uplink control information can be ensured even when a mobile station has high mobility. Further, an additional operation is not required in sequence reordering, and thus performance can be improved without increase of complexity.

Figure 27:
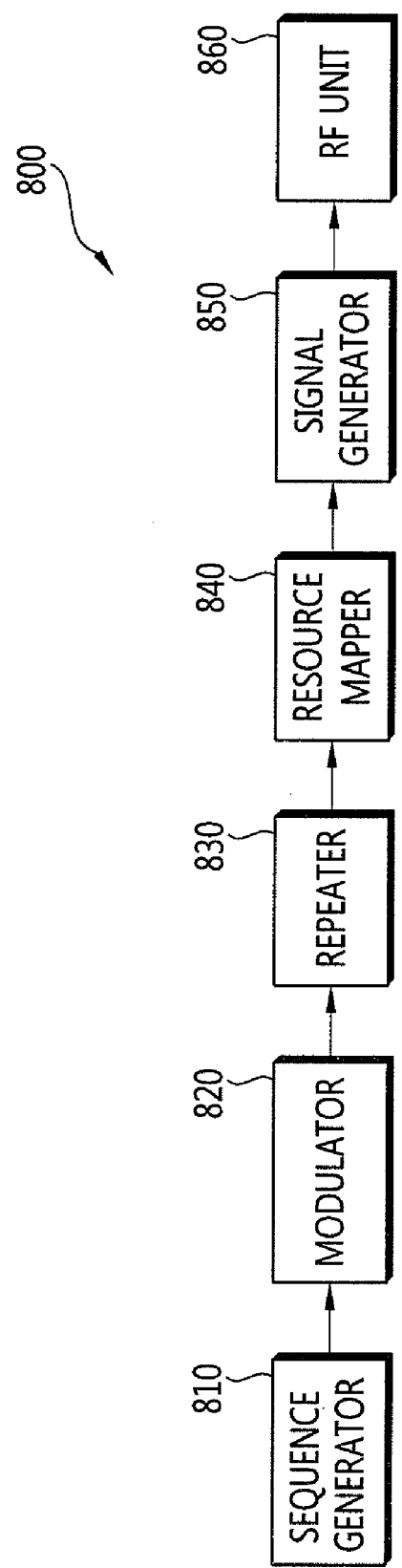
FIG. 27 is a block diagram showing a transmitter according to an embodiment of the present invention.

FIG. 27 is a block diagram showing a transmitter according to an embodiment of the present invention. When uplink control information is transmitted, a transmitter 800 may be a part of an MS. The transmitter 800 includes a sequence generator 810, a modulator 820, a repeater 830, a resource mapper 840, a signal generator 850, and a radio frequency (RF) unit 860. The sequence generator 810 determines a sequence corresponding to control information from a sequence set. For example, the sequence generator 810 may determine a sequence from a sequence set of Table 1 corresponding to 6-bit control information. The modulator 820 modulates the sequence to generate a reference modulation symbol set corresponding to a mini unit. The modulator 820 may perform BPSK modulation on the sequence. The repeater 830 repeats the reference modulation symbol set so that the number of modulation symbol sets is equal to the number of a plurality of mini units included in a resource unit. Further, the repeater 830 reorders the generated repeated modulation symbol set in a subgroup unit and generates a reordered modulation symbol set. When 3 mini units are included in the resource unit, a first reordered modulation symbol set and a second reordered modulation symbol set are generated in addition to the reference modulation symbol set. The repeater 830 may reorder the modulation symbol sets by using various methods described in the embodiments of FIG. 3 to FIG. 26. The resource mapper 840 maps the reference modulation symbol set and the first and second reordered modulation symbol sets respectively to the 3 mini units included in the resource unit. The resource unit may be a radio resource used in transmission of a fast feedback channel. The signal generator 850 converts a modulation symbol set mapped to a resource into a transmit signal. When using an OFDM/OFDMA-based system, the signal generator 850 may perform inverse fast Fourier transform (IFFT). The RF unit 860 transforms the transmit signal into a radio signal and then transmits the converted radio signal.

Figure 28:
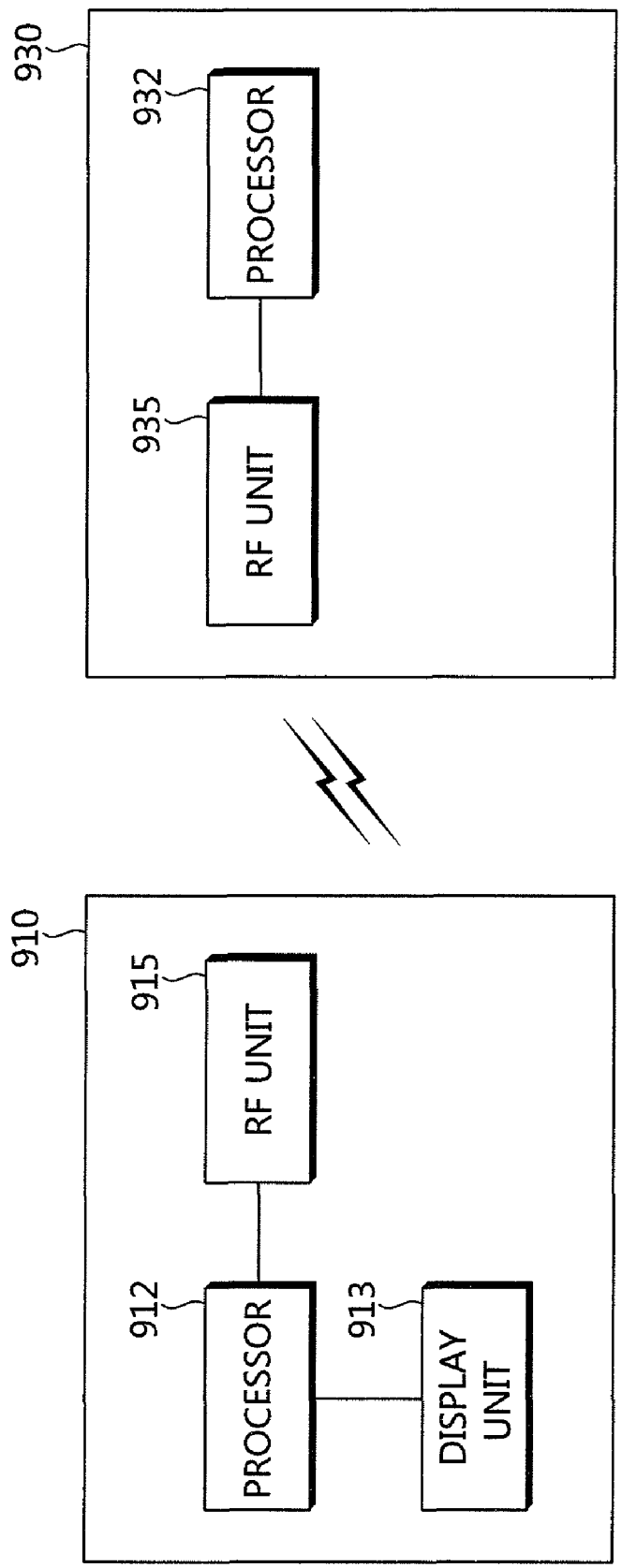
FIG. 28 is a block diagram showing a wireless communication system according to an embodiment of the present invention.

FIG. 28 is a block diagram showing a wireless communication system according to an embodiment of the present invention. An MS 910 includes a processor 912, a display unit 913, and an RF unit 915. The processor 912 configures an uplink control channel, and transmits control information through the uplink control channel. The uplink control channel may be a fast feedback channel. The uplink control channel may be transmitted using a resource unit consisting of 3 mini units. The aforementioned method of transmitting control information can be implemented by the processor 912. Sequence reordering described in the embodiments of FIG. 3 to FIG. 26 can be implemented by the processor 912. The display unit 913 is coupled to the processor 912 and displays various information to a user. The display unit 913 may use a well-known element such as a liquid crystal display (LCD), an organic light emitting diode (OLED), etc. The RF unit 915 is coupled to the processor 912 and transmits and/or receives radio signals.

A BS 930 includes a processor 932 and an RF unit 935. The RF unit 935 receives a radio signal from the MS 910. The processor 932 receives control information through an uplink control channel. To detect the control information, the uplink control channel may use coherent detection. That is, a resource unit used in the uplink control channel is not provided with a reference signal, and the processor 932 can detect control information by using a correlation property of a sequence.

The processors 912, 932 may include application-specific integrated circuit (ASIC), other chipset, logic circuit and/or data processing device. The RF units 915, 935 may include baseband circuitry to process radio frequency signals. When the embodiments are implemented in software, the techniques described herein can be implemented with modules (e.g., procedures, functions, protocols and so on) that perform the functions described herein. The modules can be executed by processors 912, 932.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of transmitting control information in a wireless communication system, performed by a mobile station, the method comprising:
   determining a sequence corresponding to control information from a sequence set;
   generating a reference modulation symbol set s corresponding to a mini unit in a resource unit by modulating the sequence, the mini unit comprising six orthogonal frequency division multiplexing (OFDM) symbols over twelve subcarriers, each OFDM symbol comprising two contiguous subcarriers, the twelve subcarriers in the mini unit being indexed from 0 to 11 in a frequency-first order;
   mapping the reference modulation symbol set s to the mini unit as follows:

$C_{i,j} = s[K_i[j]]$, for $i=0,1,2$, $0 \leq j \leq 11$ where $C_{i,j}$ denotes a j-th logical subcarrier in an i-th mini unit, s[k] denotes a k-th modulation symbol in the modulation symbol set s, $K_i[j]$ denotes an j-th element of $K_i$, $K_0 = \{0,1,2,3,4,5,6,7,8,9,10,11\}$, $K_1 = \{9,10,11,3,4,5,0,1,2,6,7,8\}$, and $K_2 = \{3,4,5,6,7,8,9,10,11,0,1,2\}$; and
   transmitting the mapped modulation symbol set s in the resource unit.

2. The method of claim 1, wherein the mini unit in the resource unit is not contiguous with another mini unit in the frequency domain.

3. The method of claim 1, wherein the resource unit is used for transmission of a fast feedback channel.

4. The method of claim 3, wherein the fast feedback channel is a primary fast feedback channel.

5. The method of claim 1, wherein the mapped modulation symbol set s in the resource unit is detected by using non-coherent detection.

6. The method of claim 1, wherein the sequence is binary phase shift keying (BPSK) modulated.

7. The method of claim 1, wherein the number of bits to represent the control information is four or six.

8. The method of claim 1, wherein the sequence set is defined as shown in the following table

| Index | Sequence |
|---|---|
| 0 | 111111111111 |
| 1 | 101111010110 |
| 2 | 011010111101 |
| 3 | 001010010100 |
| 4 | 101010101010 |
| 5 | 111010000011 |
| 6 | 001111101000 |
| 7 | 011111000001 |
| 8 | 110011001100 |
| 9 | 100011100101 |
| 10 | 010110001110 |
| 11 | 000110100111 |
| 12 | 100110011001 |
| 13 | 110110110000 |
| 14 | 000011011011 |
| 15 | 010011110010 |
| 16 | 101011111100 |
| 17 | 111011010101 |
| 18 | 001110111110 |
| 19 | 011110010111 |
| 20 | 111110101001 |
| 21 | 101110000000 |
| 22 | 011011101011 |
| 23 | 001011000010 |
| 24 | 100111001111 |
| 25 | 110111100110 |
| 26 | 000010001101 |
| 27 | 010010100100 |
| 28 | 110010011010 |
| 29 | 100010110011 |
| 30 | 010011011000 |
| 31 | 000111110001 |
| 32 | 101011001001 |
| 33 | 111011100000 |
| 34 | 001110001011 |
| 35 | 011110100010 |
| 36 | 100111111010 |
| 37 | 110111010011 |
| 38 | 000010111000 |
| 39 | 010010010001 |
| 40 | 111110011100 |
| 41 | 101110110101 |
| 42 | 011011011110 |
| 43 | 001011110111 |
| 44 | 101010011111 |
| 45 | 111010110110 |
| 46 | 001111011101 |
| 47 | 011111110100 |
| 48 | 111111001010 |
| 49 | 101111100011 |
| 50 | 011010001000 |
| 51 | 001010100001 |

-continued

| Index | Sequence |
| --- | --- |
| 52 | 110010101111 |
| 53 | 100010000110 |
| 54 | 010111101101 |
| 55 | 000111000100 |
| 56 | 100110101100 |
| 57 | 110110000101 |
| 58 | 000011101110 |
| 59 | 010001000111 |
| 60 | 110011111001 |
| 61 | 100011010000 |
| 62 | 010110111011 |
| 63 | 000110010010. |

9. A mobile station comprising:
a radio frequency (RF) unit configured to transmit a radio signal; and
a processor operatively coupled with the RF unit and configured to:
determine a sequence corresponding to control information from a sequence set;
generate a reference modulation symbol set s corresponding to a mini unit in a resource unit by modulating the sequence, the mini unit comprising six orthogonal frequency division multiplexing (OFDM) symbols over twelve subcarriers, each OFDM symbol comprising two contiguous subcarriers, the twelve subcarriers in the mini unit being indexed from 0 to 11 in a frequency-first order; and
map the reference modulation symbol set s to the mini unit as follows:

$$C_{i,j}=s[K_i[j]], \text{ for } i=0,1,2, 0 \leq j \leq 11$$

where $C_{i,j}$ denotes a j-th logical subcarrier in an i-th mini unit, s[k] denotes a k-th modulation symbol in the modulation symbol set s, $K_i[j]$ denotes an j-th element of $K_i$, $K_0=\{0,1,2,3,4,5,6,7,8,9,10,11\}$, $K_1=\{9,10,11,3,4,5,0,1,2,6,7,8\}$, and $K_2=\{3,4,5,6,7,8,9,10,11,0,1,2\}$.

10. The mobile station of claim 9, wherein the mini unit in the resource unit is not contiguous with another mini unit in the frequency domain.

11. The mobile station of claim 9, wherein the resource unit is used for transmission of a fast feedback channel.

12. The mobile station of claim 11, wherein the fast feedback channel is a primary fast feedback channel.

13. The mobile station of claim 9, wherein the mapped modulation symbol set s in the resource unit is detected by using non-coherent detection.

14. The mobile station of claim 9, wherein the sequence is binary phase shift keying (BPSK) modulated.

15. The mobile station of claim 9, wherein the number of bits to represent the control information is four or six.

* * * * *